United States Patent
Kozu

(10) Patent No.: US 8,285,505 B2
(45) Date of Patent: Oct. 9, 2012

(54) LENS EVALUATION METHOD, LENS EVALUATION DEVICE, LENS MANUFACTURING METHOD, AND LENS CHARACTERISTIC DISPLAY METHOD

(75) Inventor: Kazuma Kozu, Tokyo (JP)

(73) Assignee: Hoya Corporation, Tokyo (JP)

( * ) Notice: Subject to any disclaimer, the term of this patent is extended or adjusted under 35 U.S.C. 154(b) by 341 days.

(21) Appl. No.: 12/675,421

(22) PCT Filed: Aug. 29, 2008

(86) PCT No.: PCT/JP2008/065581
§ 371 (c)(1),
(2), (4) Date: Feb. 26, 2010

(87) PCT Pub. No.: WO2009/028684
PCT Pub. Date: Mar. 5, 2009

(65) Prior Publication Data
US 2010/0250171 A1    Sep. 30, 2010

(30) Foreign Application Priority Data

Aug. 31, 2007   (JP) ................................. 2007-227176

(51) Int. Cl.
*G01N 1/00* (2006.01)
(52) U.S. Cl. ........................................... 702/81; 351/41
(58) Field of Classification Search ............ 702/81, 702/82, 182–185; 351/41, 169, 168
See application file for complete search history.

(56) References Cited

U.S. PATENT DOCUMENTS

| 7,158,222 B2 * | 1/2007 | Taguchi et al. | 356/127 |
| 2005/0179863 A1 | 8/2005 | Taguchi et al. | |
| 2005/0237513 A1 | 10/2005 | Hayashi et al. | |

FOREIGN PATENT DOCUMENTS

| JP | 8 304228 | 11/1996 |
| JP | 10 507825 | 7/1998 |
| JP | 2000 186978 | 7/2000 |
| JP | 2005 308642 | 11/2005 |
| JP | 2006 208348 | 8/2006 |
| JP | 2007 303900 | 11/2007 |
| WO | 03 098181 | 11/2003 |

OTHER PUBLICATIONS

U.S. Appl. No. 12/675,301, filed Feb. 25, 2010, Kozu.

* cited by examiner

*Primary Examiner* — Edward Raymond
(74) *Attorney, Agent, or Firm* — Oblon, Spivak, McClelland, Maier & Neustadt, L.L.P.

(57) ABSTRACT

The present invention is to provide a lens evaluation method capable of easily evaluating whether there is a difference which greatly changes locally in a lens, and evaluating the degree of the difference. According to the lens evaluation method of the present invention, first, power a distribution of a plurality of measurement point in an arbitrary direction. Next, a calculation power distribution (a design power distribution) is created. Further, a difference distribution between an actually measured power distribution, which indicates an actual power distribution, and a calculation power distribution is obtained. Further, the difference distribution is differentiated to obtain a difference index, and an evaluation is performed based on the difference index to evaluate whether there is a difference which greatly changes locally in a lens, and evaluate the degree of the difference.

10 Claims, 11 Drawing Sheets

LENS EVALUATION METHOD, LENS EVALUATION DEVICE, LENS MANUFACTURING METHOD, AND LENS CHARACTERISTIC DISPLAY METHOD

TECHNICAL FIELD

The present invention relates to an evaluation method and an evaluation device for evaluating optical performance, surface shape and the like of a spectacle lens or a mold used to molding the spectacle lens, a spectacle lens manufacturing method for manufacturing a spectacle lens using the evaluation method and/or the evaluation device, and a display method for displaying optical characteristics of the spectacle lens.

BACKGROUND ART

When manufacturing/processing a spectacle lens, it is necessary to evaluate the obtained spectacle lens to see whether or not the both optical surfaces thereof have the required optical performance and surface shape set forth in the applicable specification or design. The spectacle lens evaluation is mainly performed by measuring the optical characteristics at measurement point(s) of the lens. Generally, if the spectacle lens is a single-vision lens, then an optical center is selected as the measurement point; if the spectacle lens is a multi-focal lens, then a distance portion optical center and positions for measuring addition power (i.e., a distance portion vertex power measurement point and a near portion reference point) are selected as the measurement points; and if the spectacle lens is a progressive-addition lens, then a distance portion reference point and positions for measuring addition power (i.e., a distance portion reference point and a near portion design reference point) are selected as the measurement points.

Incidentally, measuring methods for measuring the optical characteristics of various kinds of spectacle lenses (the single-vision spectacle lens, the multi-focal spectacle lens and the progressive-addition lens) and allowance for measured value are specified in ISO, JIS and the like.

However, since the wearer of the spectacle lens also sees things through the region other than the measurement point(s) of the lens, there is a desire to develop an evaluation method in which the lens is evaluated in a wide region, instead of being evaluated at the aforesaid measurement point(s) only. For example, it is important to evaluate the lens in a wide region particularly in the case where one or both surfaces of the lens have complicated surface shape, such as a progressive-addition lens.

As prior arts, it is proposed that the lens is evaluated by actually measuring a three-dimensional shape of the lens surface, and the optical characteristics are calculated based on the three-dimensional shape (see, for example, Patent Documents 1 and 3). Further, it is also proposed to provide a method and device to measure the optical characteristics, such as a dioptric power distribution (referred to as a "power distribution" hereinafter), of the lens in a wide region (see Patent Document 2), and evaluate the optical characteristics of the lens based on a difference distribution between a measured power distribution in a wide region and a power distribution obtained based on design data (see Patent Document 4).

An astigmatism distribution (i.e., a distribution of the absolute value of cylindrical power C), an average power distribution [i.e., a power distribution expressed by S+C/2 (herein, S represents spherical power, and C represents cylindrical power)], and the like are used as the measured power distribution.

Further, since the mold used for molding the spectacle plastic lens is formed of glass whose molding surface is transferred to the plastic lens, the molding surface of the mold has to be formed with the same accuracy as that of the surface of the spectacle lens. Thus, in the case where the mold is formed to be conformed to the shape of the lens, the mold can be evaluated in the same manner as the spectacle lens.

Patent Document 1: Japanese Unexamined Patent Application Publication No. H08-304228
Patent Document 2: Published Japanese Translations of PCT International Publication for Patent Application Publication No. H10-507825
Patent Document 3: Japanese Unexamined Patent Applications Publication No. 2000-186978
Patent Document 4: Domestic Re-publication of PCT International Publication for Patent Applications Publication No. WO2003/098181

DISCLOSURE OF THE INVENTION

According to the evaluation method disclosed in Patent Document 4, it is possible to evaluate the optical surface of the lens in a wide region, and it is possible to grasp the degree of the difference between the actually measured dioptric power and the design dioptric power at each of the measurement point(s). Further, by previously setting an allowance, it is possible to grasp whether the difference at each of the measurement point(s) is within the allowance or not. However, the method disclosed in the prior arts fails to specify the type of difference.

Specifically, there are two types of differences, a first type of difference includes the following two cases: one is the case where a difference having substantially the same value is caused over a region of the lens, and the other is the case where a difference which changes slowly is caused over a region of the lens. These differences are collectively called a "regular difference" (or a "total difference"). A second type of difference includes a case where a difference which changes greatly and is caused locally. Such a difference is called an "irregular difference" (or a "local difference") in contrast to the "regular difference". Particularly, since the irregular difference (i.e., the local difference) is apt to cause the wearer to feel distortion and/or sway, the irregular difference may cause problem even if its value is within the allowance. However, in the evaluation method according to the prior arts, the regular difference (i.e., the total difference) and the irregular difference (i.e., the local difference) are not distinguished from each other.

Focusing on the type of difference, a first object of the present invention is to provide a method capable of determining whether there is an irregular difference or not, and evaluating the degree of the irregular difference.

Further, in the measurement method and the evaluation method disclosed in the prior arts, the average power distribution and the astigmatism distribution are used as indexes of the optical characteristic, and evaluation is performed based on these distributions. However, since information on cylinder axis is not contained in these distributions, it is difficult to perform evaluation taking into consideration of cylinder axis. Further, in the case where the mold is evaluated, the same problems with the spectacle lens will occur.

A second object of the present invention is to provide an evaluation method and an evaluation device for evaluating the lens or mold (i.e., the object to be evaluated) focusing on the local difference, based on the difference between the measured power distribution of the lens or mold and the power distribution obtained based on the design data, a spectacle lens manufacturing method for manufacturing a spectacle lens using the evaluation method or the evaluation device, and a display method for displaying optical characteristics of a spectacle lens.

A lens evaluation method according to an aspect of the present invention includes the following steps (1) to (5):

(1) A power distribution converting step for obtaining a power distribution of a plurality of measurement points in an arbitrary direction based on an actually measured power distribution of a spectacle lens, the actually measured power distribution consisting of a point group indicating spherical power, cylindrical power and cylinder axis;

(2) A calculation power distribution creating step for creating a calculation power distribution (i.e., a design power distribution) of the spectacle lens;

(3) A difference distribution calculating step for obtaining a difference distribution between the actually measured power distribution, which indicates an actual power distribution of the spectacle lens, and the calculation power distribution;

(4) A difference index calculating step for obtaining a difference index by differentiating the difference distribution obtained in the difference distribution calculating step with respect to the distance between the plurality of measurement points in the lens; and (5) An evaluation step for evaluating the spectacle lens based on the difference index calculated in the difference index calculating step.

A lens evaluation device according to another aspect of the present invention includes: a power distribution measuring device for measuring power which includes spherical power, cylindrical power and cylinder axis at a plurality of measurement points of a spectacle lens to obtain an actually measured power distribution; and an evaluation computer having a processor for evaluating the spectacle lens using the actually measured power distribution.

The processor of the evaluation computer performs the following processes (1) to (5):

(1) A power distribution converting process obtaining a power distribution of the plurality of measurement points in an arbitrary direction based on the actually measured power distribution;

(2) A calculation power distribution creating process for creating a calculation power distribution (i.e., a design power distribution) of the spectacle lens;

(3) A difference distribution calculating process for obtaining a difference distribution between the actually measured power distribution, which indicates an actual power distribution of the spectacle lens, and the calculation power distribution;

(4) A difference index calculating process for obtaining a difference index by differentiating the difference distribution obtained in the difference distribution calculating process with respect to the distance between the plurality of measurement points in the lens; and (5) An evaluation process for evaluating the spectacle lens based on the difference index calculated in the difference index calculating process.

A method for manufacturing a spectacle lens according to further another aspect of the present invention includes: a step for optically finishing optically-unfinished surface(s) of a lens blank; and a lens evaluation step for evaluating whether a difference from design data of the lens with both surfaces optically finished is within an allowance or not.

The lens evaluation step includes the following steps (1) to (5):

(1) A power distribution converting step for obtaining a power distribution of a plurality of measurement points in an arbitrary direction based on an actually measured power distribution of the spectacle lens, the actually measured power distribution consisting of a point group indicating spherical power, cylindrical power and cylinder axis;

(2) A calculation power distribution creating step for creating a calculation power distribution (i.e., a design power distribution) of the spectacle lens;

(3) A difference distribution calculating step for obtaining a difference distribution between the actually measured power distribution, which indicates an actual power distribution of the spectacle lens, and the calculation power distribution;

(4) A difference index calculating step for obtaining a difference index by differentiating the difference distribution obtained in the difference distribution calculating step with respect to distance between the a plurality of measurement points in the lens; and (5) An evaluation step for evaluating the spectacle lens based on the difference index calculated in the difference index calculating step.

A method for displaying characteristics of a lens according to further another aspect of the present invention includes the following steps (a) to (f):

(a) A power distribution converting step for obtaining a power distribution of a plurality of measurement points in an arbitrary direction based on an actually measured power distribution of a spectacle lens, the actually measured power distribution consisting of a point group indicating spherical power, cylindrical power and cylinder axis;

(b) A calculation power distribution creating step for creating a calculation power distribution (i.e., a design power distribution) of the spectacle lens;

(c) A difference distribution calculating step for obtaining a difference distribution which represents a distribution of a difference between the actually measured power distribution, which indicates an actual power distribution of the spectacle lens, and the calculation power distribution;

(d) A difference index calculating step for obtaining a difference index by differentiating the difference distribution obtained in the difference distribution calculating step with respect to distance between the a plurality of measurement points in the lens;

(e) A difference index distribution creating step for creating, based on the difference index calculated in the difference index calculating step, a distribution of the difference index within the spectacle lens; and (f) A display step for displaying the difference index distribution created in the difference index distribution creating step.

According to the present invention, it is possible to easily grasp whether there is a local difference and the degree of the local difference, therefore the evaluation can be performed with higher accuracy. Further, since it is possible to perform evaluation taking into consideration of cylinder axis at each of the measurement point(s), the evaluation can be performed with higher accuracy.

Furthermore, according to the present invention, it is possible to easily distinguish the local difference and the total difference from each other, therefore the cause of the difference can be easily specified. As a result, is possible to quantitatively express the degree of the difference between the actual power distribution of the manufactured lens and the power distribution obtained based on the design data, and therefore the characteristic of the surface shape of the lens can be evaluated objectively and precisely.

Further, by using the manufacturing method according to the present invention, it is possible to easily manufacture a lens whose local difference is controlled within the allowance.

BEST MODES FOR CARRYING OUT THE INVENTION

Figure 1:
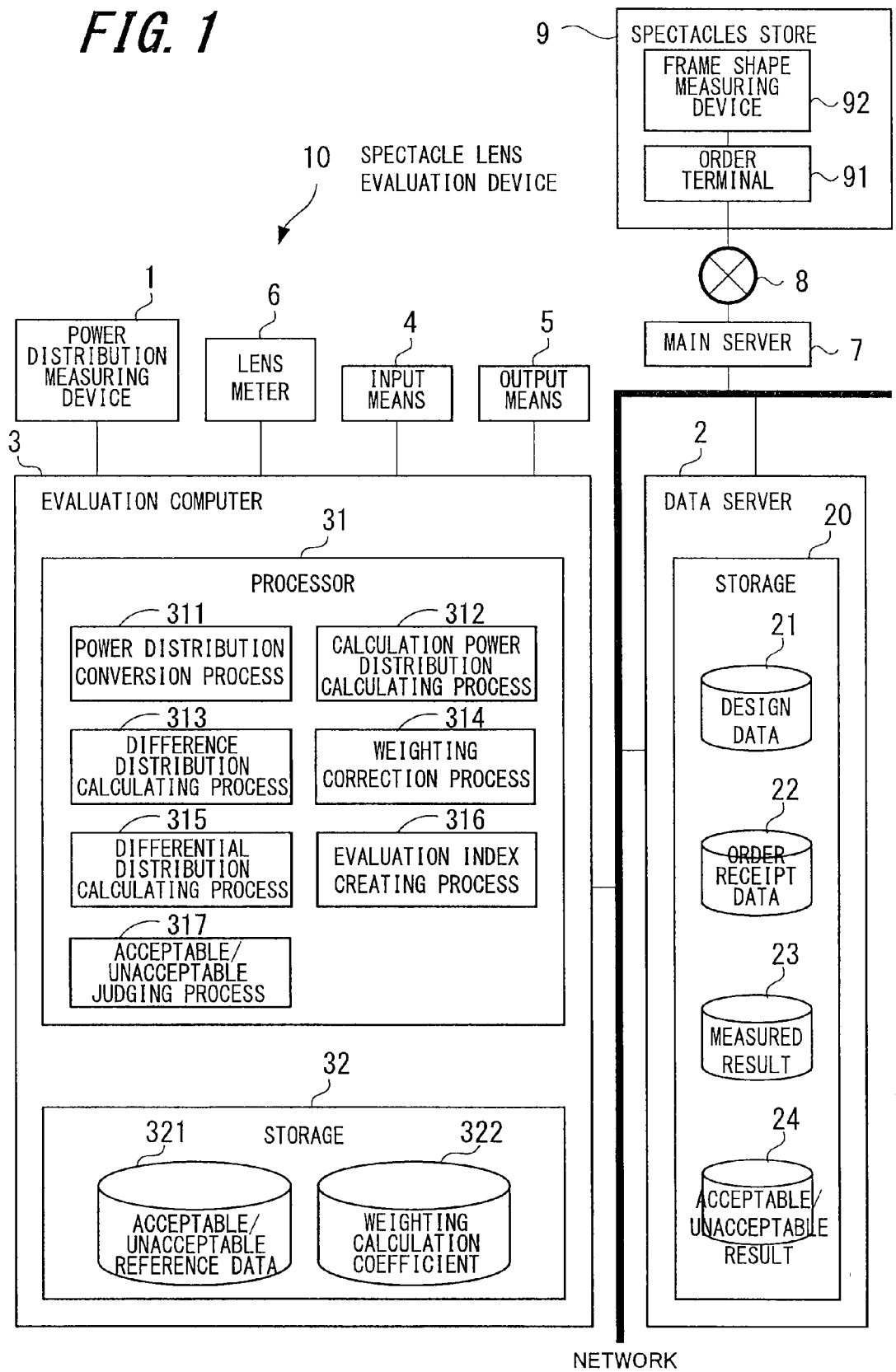
FIG. 1 is a block diagram showing a schematic configuration of a spectacle lens evaluation device according to an embodiment of the present invention.

Focusing on the two types of differences, i.e., the regular difference (the total difference) and the irregular difference (the local difference), the inventors of the present invention find that it is possible to perform a precise evaluation (which is impossible to be performed by the prior arts) by determining whether or not there is an irregular difference and evaluating the degree of the irregular difference.

Herein, since the "regular difference" represents a regular difference over the whole spectacle lens and therefore may also be detected simply by a conventional method in which a lens meter is used to detect the measurement point(s) of the lens, so that the difference can be easily extracted. Further, an acceptable/unacceptable judgment can be performed by judging whether the difference between the measured power and the design power is within the allowance specified in ISO, JIS or other stricter standard made by the lens manufacturer itself.

However, since the "irregular difference" represents a difference which only exists in a very small portion of the spectacle lens and therefore is difficult to be detected using the conventional method with the lens meter, so that the difference can not be easily extracted. Another method can be considered is to measure many points in a wide region to obtain the distribution of the differences at the many points. However, it is difficult to judge whether the difference distribution obtained in such a manner is referred to as a total difference or a local difference. Further, even if it is known that the difference distribution is referred to as a local difference, it is still difficult to know what degree of the local difference is generated in the total difference.

To solve these problems, the inventors of the present invention disclose a technique to extract the irregular difference, and numerically characterize the extracted irregular difference. Specifically, as an effective method for characterizing the power distribution of the irregular difference, the inventors find the fact that, when differentiating the difference distribution, the differential value will be a large value, instead of zero, if the difference is an irregular difference. Further, by using this fact, the inventors find that the irregular difference can be easily identified by calculating the first-order derivative of the difference.

However, the differentiation is only possible to be performed by using an index of the difference distribution which changes continuously. On the other hand, in the indexes used in the prior arts, since the astigmatism distribution lacks continuity, the astigmatism distribution can not be used to perform differentiation. As for the astigmatism distribution and the average power distribution, since directionality (cylinder axis) is not taken into consideration, each value of the astigmatism distribution and the average power distribution is resulted by much information, therefore the astigmatism distribution and the average power distribution are both unsuitable to be used as the index of the difference distribution. Therefore it is important to create a difference distribution based on a continuous power distribution and differentiate the difference distribution.

The best embodiment of the present invention is described below base on these findings. It should be understood that this embodiment is merely an example of the present invention, and various modifications can be made without departing from the spirit and scope of the present invention.

[Spectacle Lens Evaluation Device]

First, a spectacle lens evaluation device according to an embodiment of the present invention is described below with reference to FIG. 1.

FIG. 1 is a block diagram showing a schematic configuration of the spectacle lens evaluation device according to the present embodiment.

A spectacle lens evaluation device 10 according to the present embodiment includes a power distribution measuring device 1, a data server 2, an evaluation computer 3, an input means 4, an output means 5 and a lens meter 6. The lens meter 6 measures the power of a spectacle lens (i.e., a lens-to-be-measured) on a spot-by-spot basis.

Figure 2:
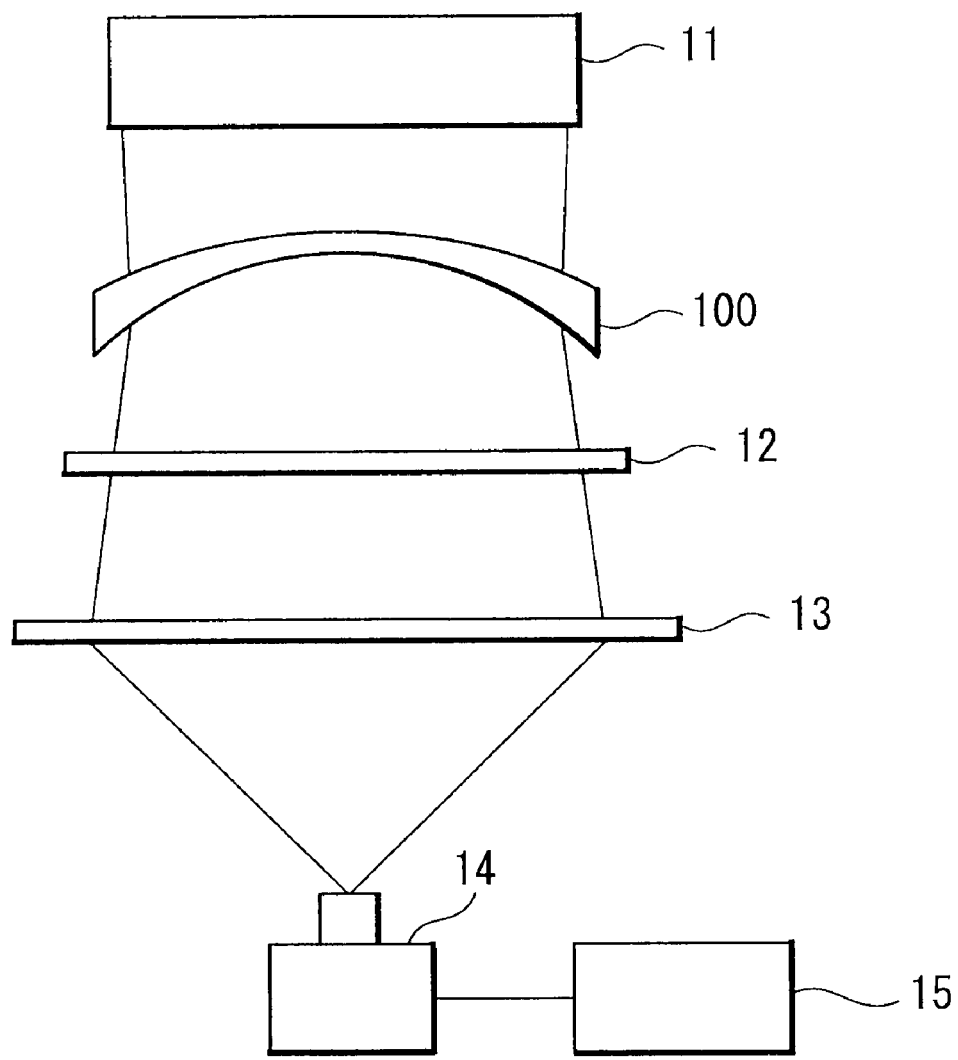
FIG. 2 is a view showing a schematic configuration of a power distribution measuring device according to the embodiment of the present invention.

The power distribution measuring device 1 is a device for measuring the power distribution of the lens-to-be-measured. A schematic configuration of the power distribution measuring device 1 will be described below with reference to FIG. 2. FIG. 2 is a view showing the schematic configuration of the power distribution measuring device 1.

Any conventional measuring device can be used as the power distribution measuring device 1 as long as the measuring device can measure spherical power S, cylindrical power C and cylinder axis Ax at many points of the lens-to-be-measured 100.

An example of the power distribution measuring device is shown in FIG. 2. The power distribution measuring device 1 includes a light source device 11, a beam splitter 12, a screen 13, a CCD camera 14 and a calculating device 15. The light source device 11 irradiates the lens-to-be-measured 100 with parallel light. The beam splitter 12 is disposed on one side of the light source device 11 with the lens-to-be-measured 100 sandwiched in between, and has a plurality of light transmitting holes (not shown) formed therein.

The beam splitter 12 has one surface facing the lens-to-be-measured 100 and the other surface opposite to the one surface, and the screen 13 faces the other surface of the beam splitter 12. The light passing through the beam splitter 12 reaches the screen 13. The CCD camera 14 takes an image displayed on the screen 13. The calculating device 15 measures the path of the light passing through the lens-to-be-measured 100 based on the image taken by the CCD camera 14, and calculates the optical characteristic of the lens-to-be-measured 100. The evaluation computer 3 shown in FIG. 1 may also be used as the calculating device 15.

When the light source device 11 irradiates the lens-to-be-measured 100 with parallel light, light is emitted from the lens-to-be-measured 100. The light emitted from the lens-to-be-measured 100 passes through the beam splitter 12 to be projected on the screen 13. The calculating device 15 measures the path of the light passing through the lens-to-be-measured 100 based on the light (image) projected on the screen 13, and calculates the optical characteristic of the lens-to-be-measured 100.

Next, the power distribution measuring device 1 shown in FIG. 1 will be described below again. The data server 2 is a computer having a data storing means, and is connected to the evaluation computer 3 via a network. Incidentally, the power distribution measuring device 1 and the data server 2 may also be directly connected to each other through a communication media such as a communication cable so that they can transmit/receive information to/from each other. The data server 2 has a storage 20 for storing data necessary for evaluating the lens-to-be-measured 100 and evaluation results of the lens-to-be-measured 100.

The storage 20 has a design data storing section 21, an order receipt data storing section 22, a measured result storing section 23 and an acceptable/unacceptable judgment result storing section 24. The design data storing section 21 stores the design data of the lens-to-be-measured 100 in advance, and the order receipt data storing section 22 stores the order receipt data in advance. The measured result storing section 23 stores the measured result data such as various kinds of measured results and the calculated results obtained by the power distribution measuring device 1 and the lens meter 6. The acceptable/unacceptable judgment result storing section 24 stores acceptable/unacceptable result data which represents acceptable/unacceptable result of the lens judged by the evaluation computer 3.

The data server 2 is connected to a main server 7 of a factory via a network. Incidentally, the main server 7 and the data server 2 may also be directly connected to each other through a communication media such as a communication cable. The main server 7 is connected to an order terminal 91 of a spectacles store 9 through a communication media 8. The present embodiment is described using an example in which the factory (which manufactures the lens) receives an online order from a customer such as a spectacles store (which orders the lens). The communication media 8 is not particularly limited. The communication media 8 can be, for example, a public communication line, an exclusive line, the internet and the like.

The spectacles store 9 is provided with the aforesaid order terminal 91 and a frame shape measuring device 92. The frame shape measuring device 92 is a device for measuring the shape of the spectacle frame. The order terminal 91 is a computer terminal for transmitting various information necessary for ordering spectacle lenses to the factory of the lens manufacturer. When the order data is transmitted from the order terminal 91 to the main server 7 in the factory, an order reception process is performed by an order reception processing program registered in the main server 7, and order receipt data is created. The created order receipt data is stored in the order receipt data storing section 22 of the data server 2.

The order receipt data includes lens information, spectacle frame information, prescribed values, layout information and the like. The lens information includes information about lens type and information about lens processing instruction. Herein, the information about lens type includes lens material, refractive index, optical design of the front surface and back surface of the lens and the like, and the information about lens processing instruction includes lens thickness, edge thickness, eccentricity, processing method of edge face, processing type of frame fitting portion, dyeing, coating and the like.

Further, the spectacle frame information includes frame size, frame material, frame color, edge shape and the like. Herein, the edge shape means data indicating the shape of the lens frame measured by the frame shape measuring device 92 and data indicating a preset edge shape in the case of, for example, a rimless frame or a Nylol frame. Further, the prescribed values include spherical power, cylindrical power, cylinder axis, prism, addition power and the like. The layout information includes pupillary distance, pupillary distance of each of both eyes, near pupillary distance, segment position, eye point position and the like.

The main server 7 in the factory is provided with a lens design program for designing lens shape. The main server 7 executes the lens design program to calculate a desired lens shape (i.e., data related to lens front surface shape, data related to lens back surface shape, data related to arrangement of the front surface and back surface of the lens, data related to edge shape, and the like) base on the order receipt data and the data necessary for designing the lens (i.e., the optical surface shape, the edge shape and the like) previously stored in the storage 20. The calculated lens shape, as design data, is stored in the design data storing section 21 of the data server 2.

In other words, the design value of the lens-to-be-measured 100 is determined based on the design data and the order receipt data. Further, the design data includes three-dimensional shape data of the front surface (the surface far from the eye of the wearer) and the back surface (the surface near from the eye of the wearer) of the lens-to-be-measured 100; data related to distance and arrangement of the front surface and back surface of the lens such as lens center thickness, prism and the like; and material parameters such as refractive index and Abbe's number (a number used for evaluating correction to chromatic aberration of an optical material) of the lens-to-be-measured 100. Incidentally, it is preferred that the three-dimensional shape data is functioned by a spline function.

Further, the main server 7 in the factory is provided with a processing data creating program for creating processing data of the lens. Based on the order receipt data and the design data, the main server 7 executes the processing data creating program to create the processing data in which various processing conditions of the lens manufacturing process (including, for example, blocking process, cutting process, polishing process, dyeing process, surface treatment process, edging process and the like) are set. The created processing data is stored in the storage 20 of the data server 2. Further, based on the order receipt data, the design data and the processing data, an uncut lens (a finished lens before edging) is manufactured, and the uncut lens is subjected to the surface treatment process, the edging process and the like according to necessity and then is delivered to the customer who places the order.

Based on the data stored in the storage 20 of the data server 2 and the data measured by the power distribution measuring device 1, the evaluation computer 3 performs evaluation on the lens-to-be-measured with respect to the design value.

The evaluation computer 3 is not only connected to the power distribution measuring device 1, the lens meter 6, the input means 4 and the output means 5, but also connected to the data server 2 via a network.

The evaluation computer 3 has a processor 31, a storage 32, and interfaces (not shown) with the power distribution measuring device 1, the lens meter 6, the data server 2, the input means 4 and the output means 5.

The processor 31 performs power distribution conversion process 311, calculation power distribution calculating process 312, difference distribution calculating process 313, weighting correction process 314, differential distribution calculating process 315, evaluation index creating process 316, and acceptable/unacceptable judging process 317. The power distribution conversion process 311 is a process for converting the power distribution [a distribution of a point group indicating (spherical power S, cylindrical power C and cylinder axis Ax)] measured by the power distribution measuring device 1 into eight continuous distributions. The calculation power distribution calculating process 312 is a process for calculating a design power distribution (i.e., a calculation power distribution). The design power distribution (i.e., the calculation power distribution) means a power distribution in the case where the spectacle lens is manufactured as is designed.

The difference distribution calculating process 313 is a process for calculating a difference distribution between the power distribution (actually measured power distribution) measured by the power distribution measuring device 1 and the design power distribution (i.e., the calculation power distribution). The weighting correction process 314 is a process for weighting (which represents degree of importance) the difference distribution calculated in the difference distribution calculating process 313. The differential distribution calculating process 315 is a process for differentiating the difference distribution having been weighted in the weighting correction process 314 with respect to distance within the lens to calculate a differential distribution. The evaluation index creating process 316 is a process for creating an evaluation index based on a difference index obtained by differentiating the difference distribution. The acceptable/unacceptable judging process 317 is a process for judging whether the lens is acceptable or unacceptable based on the evaluation index created in the evaluation index creating process 316.

The storage 32 has an acceptable/unacceptable reference storing section 321 and a weighting calculation coefficient storing section 322. The acceptable/unacceptable reference storing section 321 has acceptable/unacceptable judging reference data stored therein, the acceptable/unacceptable judging reference data being used in the acceptable/unacceptable judging process 317. Further, the weighting calculation coefficient storing section 322 has weighting calculation coefficients stored therein, the weighting calculation coefficients being used in the weighting correction process.

The input means 4 is used for inputting data for identifying the lens-to-be-measured into the evaluation computer 3. Examples of the input means 4 include, for example, a barcode reader, a two-dimensional code reader, an IC chip reader, a keyboard, a means for receiving identification data transmitted from another device, and the like. Further, examples of the data inputted by the input means 4 include identification data (which is to be described later).

The output means 5 displays or outputs a power distribution (a calculation power distribution) of a design lens, the power distribution (the actually measured power distribution) of the lens-to-be-measured 100 measured by the power distribution measuring device 1, a difference distribution of the lens-to-be-measured 100 with respect to the design lens, an acceptable/unacceptable judging result obtained based on the difference distribution, and the like. Examples of the output means 5 include, for example, a display device, a printer, a means for outputting the results as data to other device(s), and the like.

[Operation of Spectacle Lens Evaluation Device]

The spectacle lens evaluation device will be described below with reference to FIGS. 1 to 3.

Figure 3:
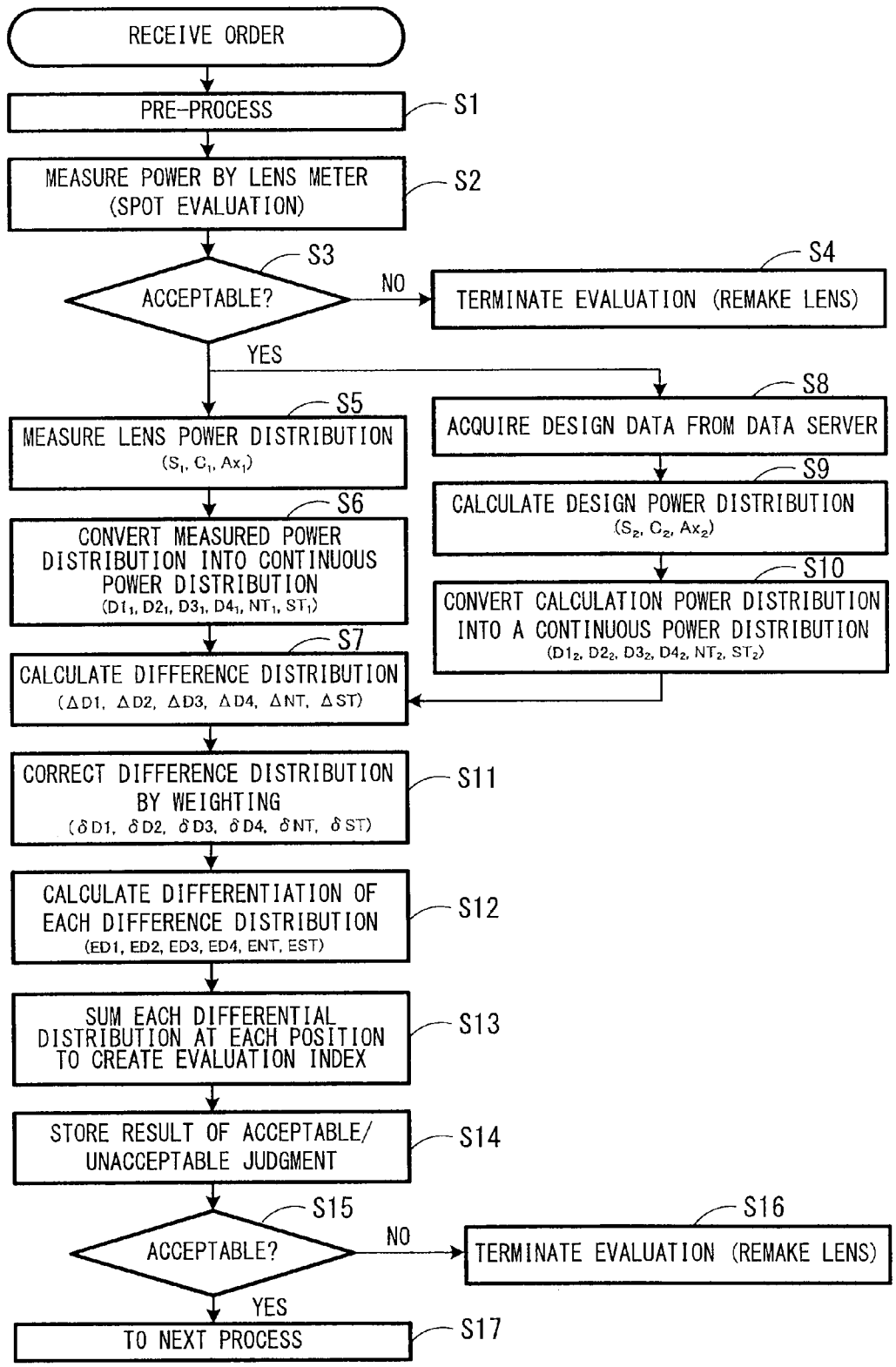
FIG. 3 is a sequence diagram showing the operation of the spectacle lens evaluation device according to the embodiment of the present invention.

FIG. 3 is a sequence diagram showing the operation of the spectacle lens evaluation device according to the present invention.

1. Pre-Process (Step S1)

First, a pre-process is performed to obtain a plastic lens (a lens-to-be-measured having both surfaces thereof optically finished) (Step S1). Specifically, in the pre-process, an uncut lens (a finished lens before edging) is manufactured based on the order receipt data, the design data and the processing data.

Since prior technologies can be used to manufacture the uncut lens, the manufacturing method of the uncut lens will not be described in detail. For example, the uncut lens having both surfaces thereof optically finished may be formed by cast polymerization molding, injection molding or the like. Further, the uncut lens may also be obtained by processing a lens blank or semi-finished lens blank (which has at least one surface optically unfinished) to optically finish the unfinished surface(s) thereof. In such a case, the optically unfinished surface(s) of the lens blank or semi-finished lens blank is (are) cut by a cutting device such as a curve generator (CG). Thereafter, the cut surface(s) is (are) polished by a polishing device, so that the uncut lens having both surfaces thereof optically finished is formed.

2. First Lens Evaluation Process (Steps S2 to S4)

Next, a first lens evaluation is performed on the uncut lens (the lens-to-be-measured 100) obtained in the pre-process.

The first lens evaluation process is a process for measuring the optical characteristics of the lens-to-be-measured 100 on a spot-by-spot basis and evaluating the measured results. In the first lens evaluation process, the actually measured value and the design value of the dioptric power at specified measurement position(s) (referred to as "first evaluation measurement point(s)" hereinafter) are compared with each other to judge whether the lens is acceptable or unacceptable. In the below description, when simply referred to as "dioptric power" (or "power"), the "dioptric power" (or "power") means optical characteristics characterized by spherical power S, cylindrical power C and cylinder axis Ax.

One or more points may be set as the first evaluation measurement point(s). Although the first evaluation measurement point(s) may be arbitrarily set, it is preferred that first evaluation measurement point(s) includes position(s) for checking the display value of the dioptric power of the lens. For example, if the lens is a single-vision lens, a position (the optical center) for measuring the power (back vertex power) of the lens is set as the position for checking the display value of the dioptric power. If the lens is a multi-focal spectacle lens, a position (distance portion reference point) for measuring the distance portion power (back vertex power) and positions for measuring addition power (i.e., a distance portion vertex power measurement point and a near portion reference point) are set as the positions for checking the display value of the dioptric power. If the lens is a progressive-addition lens, a position (a distance portion reference point) for measuring the distance portion power (back vertex power) and positions for measuring the addition power (i.e., a distance portion reference point and a near portion design reference point) are set as the positions for checking the display value of the dioptric power.

In the first lens evaluation process, the dioptric power at the first evaluation measurement point(s) is first measured with the lens meter 6 (refer to FIG. 1) (Step S2). The measurement result is transmitted to the evaluation computer 3. Incidentally, in the case where many points in a wide region are set as the first evaluation measurement points, the dioptric power at respective points may also be measured by using, for example, the device disclosed in Patent Document 4 with which the dioptric powers at many points can be measured at one time.

Next, the evaluation computer 3 judges whether the measurement result supplied by the lens meter 6 meets the allowance condition or not, and thereby judges whether the lens is acceptable or unacceptable (Step S3).

The steps for the evaluation computer 3 to acquire the allowance condition will be described below.

First, identification data attached to the lens-to-be-measured 100 is read by the input means (such as a bar-code reader or an IC chip reader) 4, wherein the identification data identifies the lens-to-be-measured 100. The identification data includes information such as information represented by the bar-code printed on a written instruction, information stored in the IC chip, and the like. The input means 4 transmits the read identification data to the evaluation computer 3.

The evaluation computer 3 transmits the identification data read by the input means 4 to the data server 2 via a network to inquire for the design data and the order receipt data of the lens-to-be-measured 100 corresponding to the identification data. Upon receiving the identification data from the evaluation computer 3, the data server 2 extracts the design data and the order receipt data of the lens-to-be-measured 100 corresponding to the identification data from the design data storing section 21 and the order receipt data storing section 22, and transmits the data to the evaluation computer 3. The design data contains information on the display value (the dioptric power and the like) at the first evaluation measurement point(s) of the lens-to-be-measured and the allowance condition of the display value. As a result, the evaluation computer 3 can acquire the allowance condition.

When it is judged that the measurement result supplied by the lens meter 6 exceeds the allowance condition in the process of Step S3, the evaluation computer 3 judges that the result of the first lens evaluation of the lens-to-be-measured 100 is unacceptable, and thereby the lens evaluation is terminated (Step S4). The unacceptable lens-to-be-measured 100 is remade, or reused as resources.

While when it is judged that the measurement result supplied by the lens meter 6 meets the allowance condition in the process of Step S3, the evaluation computer 3 judges that the result of the first lens evaluation of the lens-to-be-measured 100 is acceptable, and thereby the processing is passed to the next step (Step S5).

3. Second Lens Evaluation Process (Steps S5 to S15)

Next, a second lens evaluation is performed on the lens-to-be-measured 100 judged acceptable in the first lens evaluation process.

The second lens evaluation process is a process for measuring the optical characteristics of the lens optical surface in a wide region and performing an evaluation to judge whether or not the lens-to-be-measured 100 has the optical characteristics within the allowance based on the design data. The second lens evaluation process includes a power distribution measuring process for measuring the actually measured power distribution of the lens-to-be-measured 100 and a power distribution converting process for obtaining a power distribution in an arbitrary direction based on the actually measured power distribution. Further, the second lens evaluation process includes a difference distribution calculating process for obtaining a difference from a calculated power distribution to calculate a difference distribution; a difference index calculating process for differentiating the difference distribution obtained in the difference distribution calculating process to obtain a difference index; and an evaluation process for evaluating the lens-to-be-measured based on the difference index.

In the second lens evaluation process, first, the actually measured power distribution of the lens-to-be-measured 100 is measured (Step S5), and the prescribed power is subtracted from the power distribution. Herein, the prescribed power means the power prescribed according to the visual acuity of the wearer who is to wear the manufactured spectacles (in the present embodiment, the spectacles have the progressive-addition lenses). In the case where the lens to be evaluated is a multi-focal spectacle lens or a progressive-addition lens, the prescribed power to be subtracted is the prescribed power of the distance portion.

Next, the actually measured power distribution with the prescribed power subtracted is converted into a continuous power distribution (Step S6). Further, the evaluation computer 3 calculates the difference distribution between the continuous power distribution converted from the actually measured power distribution and the continuous power distribution converted from the calculation power distribution with the prescribed power (the design power distribution) subtracted (Step S7).

Next, the difference distribution is corrected by being weighted (Step S11). Thereafter, the difference distribution is differentiated to calculate the difference index (Step S12). Further, the evaluation index is created based on the difference index (Step S13). A judgment is performed to determine whether the lens is acceptable or unacceptable using the evaluation index created in Step 13 (Steps S14, S15). Further, if it is judged that the lens is unacceptable in Step S15, then the lens evaluation is terminated (Step S16); and if it is judged that the lens is acceptable, then the processing is passed to the next step (Step S17).

Details of each step of the second lens evaluation process will be described below.

(1) Power Distribution Measuring Process (Step S5)

In the power distribution measuring process, the dioptric power is measured by the power distribution measuring device 1 for many measurement points (referred to as "second evaluation measurement points" hereinafter) in a wide region, and the dioptric power distribution of the lens-to-be-measured 100 is obtained based on the measurement result. Incidentally, in the present embodiment, the dioptric power distribution (or the power distribution) means a distribution of points characterized by spherical power S, cylindrical power C and cylinder axis Ax. Further, the measuring device for measuring the dioptric power of the second evaluation measurement points can be any device as long as it can measure the dioptric power at many measurement points in a wide region, instead of being limited to the power distribution measuring device 1.

Details of creating the power distribution using the power distribution measuring device 1 will be described below with reference to FIG. 4.

Figure 4:
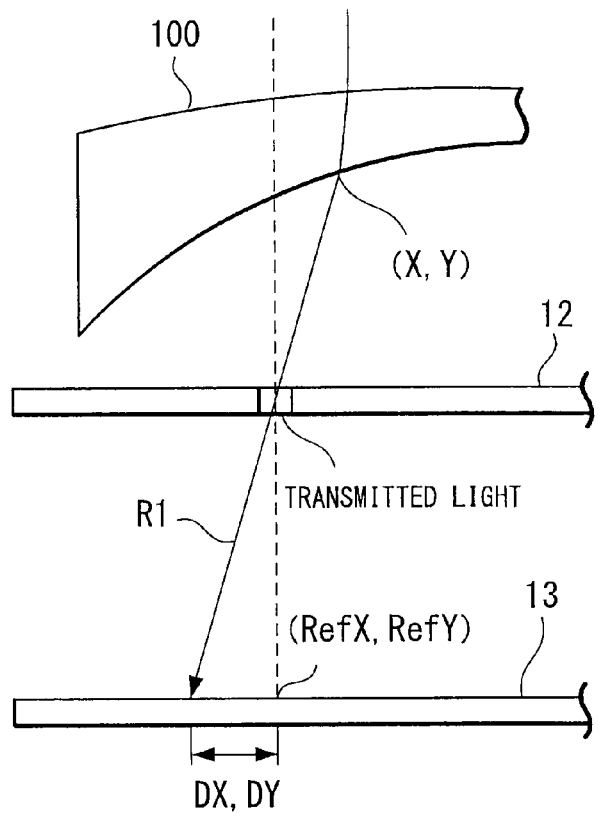
FIG. 4 is a view explaining measured data outputted from the power distribution measuring device according to the embodiment of the present invention.

FIG. 4 is a view explaining measured data outputted from the power distribution measuring device 1.

First, the lens-to-be-measured 100 is set on the power distribution measuring device 1, and the measurement is started. When the measurement is started, a parallel light is emitted from the light source device 11, and the parallel light passes through the lens-to-be-measured 100 to be split into a plurality of light beams by the beam splitter 12. Thus, a plurality of light spots corresponding to the plurality of light transmitting holes of the beam splitter 12 are projected on the screen 13.

The power distribution measuring device 1 obtains reference coordinates RefX, RefY, coordinates X, Y, deviation DX, DY and dioptric power as measured data.

The reference coordinates RefX, RefY indicate positions of the light spots (referred to as "correction spots" hereinafter) on the screen 13 in a state where the lens-to-be-measured 100 is not set. The coordinates X, Y indicate positions (referred to as "measurement points" hereinafter) where the light of the light source device 11 is emitted from the surface of the lens-to-be-measured 100 facing the beam splitter 12.

The deviation DX, DY is a deviation between the positions of the light spots (referred to as "measurement spots" hereinafter) on the screen 13 in a state where the lens-to-be-measured 100 is set and the positions of the correction spots (i.e., the correction spots which have passed through the same light transmitting holes as the measurement spots have) corresponding to the light spots. The dioptric power is calculated based on the light path of the light having passed through the lens-to-be-measured 100.

The reference coordinates RefX, RefY, the coordinates X, Y, the deviation DX, DY and the dioptric power are outputted corresponding to each of the spots. Thus, the dioptric power at coordinates X, Y of each of the measurement points can be obtained, in other words, the dioptric power distribution (i.e., spherical power $S_1$, cylindrical power $C_1$, and cylinder axis $Ax_1$) of the lens-to-be-measured 100 can be obtained. The obtained dioptric power distribution of the lens-to-be-measured 100 is transmitted to the evaluation computer 3 as the power distribution.

Next, the power distribution with the prescribed power subtracted therefrom is created.

In the entire region, the evaluation computer 3 subtracts the prescribed power from the actually measured power distribution ($S_1$, $C_1$, $Ax_1$) of the lens-to-be-measured 100 received from the power distribution measuring device 1 to create a reference actually measured power distribution ($S_1'$, $C_1'$, $Ax_1'$).

The reason why the prescribed power (the prescribed power of the distance portion) should be subtracted from the dioptric power distribution to create the reference actually measured power distribution is because the dioptric power corresponding to the prescribed power is dioptric power necessary to be formed in a wide region of the lens, and the evaluation can be performed more properly if the evaluation is performed only on the remaining dioptric power from which the prescribed power has been subtracted. Incidentally, "the prescribed power is subtracted from the power distribution" means that the power distribution is corrected so that the distance power (S, C, Ax) prescribed in the entire region of the lens is eliminated.

(2) Process for Converting Reference Actually Measured Power Distribution into Continuous Power Distribution (Step S6).

A process for creating the average power distribution, the astigmatism distribution and the continuous power distribution based on the reference actually measured power distribution obtained in Step S5 will be described below with reference to FIGS. 5 and 6.

Figure 5:
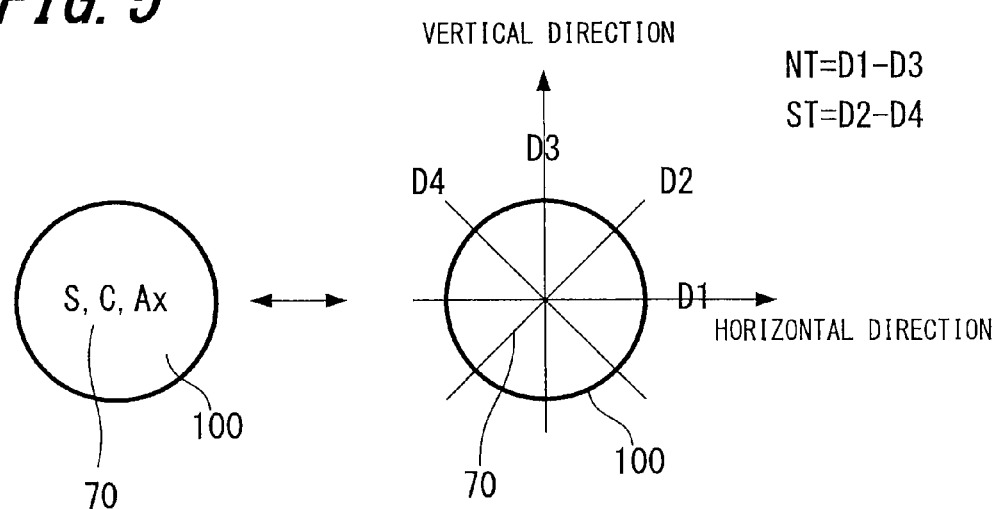
FIG. 5 is a view explaining a process for converting a power distribution (S, C, Ax) into power distributions (D1, D2, D3, D4, NT, ST) in an example.

FIG. 5 is a view explaining the processing for converting a reference actually measured power distribution ($S_1'$, $C_1'$, $Ax_1'$) into power distributions (D1, D2, D3, D4, NT, ST). FIG. 6 is a view showing the average power distribution, the astigmatism distribution and the power distributions (D1, D2, D3, D4, NT, ST) obtained based on the reference actually measured power distribution ($S_1'$, $C_1'$, $Ax_1'$).

As shown in FIG. 5, the reference actually measured power distribution ($S_1'$, $C_1'$, $Ax_1'$) is formed by a point group obtained by characterizing the second evaluation measurement points 70 with spherical power S, cylindrical power C and cylinder axis Ax. The average power distribution and the astigmatism distribution are created based on the reference actually measured power distribution.

The average power distribution is a distribution of a value calculated by summing spherical power S and half of cylindrical power C of each the second evaluation measurement points 70, i.e., the average power distribution is a distribution of the value ($S_1'+C_1'/2$). Further, the astigmatism distribution is a distribution of the absolute value of cylindrical power C of each of the second evaluation measurement points 70, i.e., the astigmatism distribution is a distribution of $|C_1'|$.

Figure 6:
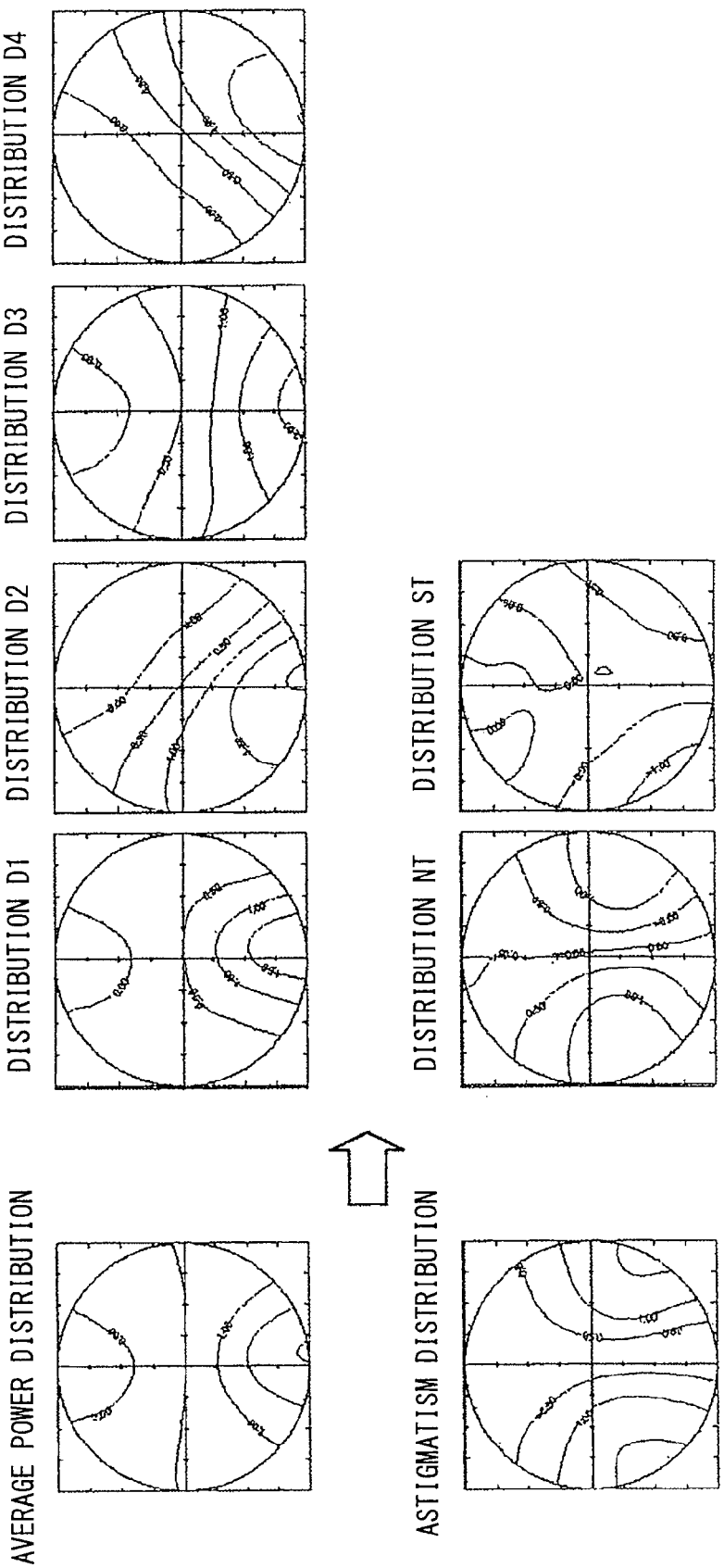
FIG. 6 is a view explaining a result of converting a power distribution ($S_1'$, $C_1'$, $Ax_1'$) into an average power distribution, an astigmatism distribution and power distributions (D1, D2, D3, D4, NT, ST) in an example.

Owing to the existence of discontinuous region, the astigmatism distribution can not be differentiated (incidentally, the discontinuous region is apt to exist on lines parallel to the vertical axis shown in FIG. 6).

Since the average power distribution is a distribution of a value (power) obtained by averaging the powers of each of the second evaluation measurement points 70 in all directions and therefore contains much information, the average power distribution can not be used to perform high-precision power distribution evaluation. Further, since information on cylinder axis Ax of each of the second evaluation measurement points 70 is not contained in the astigmatism distribution and the average power distribution, the astigmatism distribution and the average power distribution can not be used to perform high-precision power distribution evaluation. To solve these problems, in addition to the astigmatism distribution and the average power distribution, a dioptric power distribution having continuity and reflecting information on cylinder axis Ax is created in Step S6.

Such a dioptric power distribution can be created by converting the reference actually measured power distribution into a power distribution which indicates power of each of the second evaluation measurement points 70 in an arbitrary direction. Since the direction of the power of each of the second evaluation measurement points 70 is unified, the dioptric power distribution created in such a manner has continuity and reflects information on cylinder axis Ax. Incidentally, although the aforesaid arbitrary direction can be suitably set, it is preferred that a plurality of equiangularly-spaced directions are set as the arbitrary direction. This is because, by converting the reference actually measured power distribution based on the plurality of equiangularly-spaced directions, the power at each of the second evaluation measurement points 70 can be grasped in more detail.

Further, as shown in FIG. 5, assuming that the horizontal direction is 0-degree and the counterclockwise direction is the positive direction, it is preferred that four directions of 0-degree (direction D1), 45-degree (direction D2), 90-degree (direction D3), 135-degree (direction D4) are set as the arbitrary direction. In such a manner, by setting the four directions of D1 to D4 as the arbitrary direction, the lens-to-be-measured can be suitably evaluated by power distributions in few directions (four directions). In other words, not only the power distributions in both the vertical direction and the horizontal direction (which are important directions in evaluating the spectacle lens) are included, and also the power distributions in the directions between the vertical direction and the horizontal direction are included. Further, if the power distributions of D1 to D4 are obtained, the power at any point and in any direction on the lens can be calculated. Incidentally, the arbitrary direction is not limited to the aforesaid four directions, but includes a plurality of directions perpendicular to each other.

In the following description, the power (dioptric power) of each of the second evaluation measurement points 70 in direction D1 is referred to as "D1", and the distribution of D1 is referred to as "distribution D1". Further, the power of each of the second evaluation measurement points 70 in direction D2 is referred to as "D2", and the distribution of D2 is referred to as "distribution D2". Further, the power of each of the second evaluation measurement points 70 in direction D3 is referred to as "D3", and the distribution of D3 is referred to as "distribution D3". Further, the power of each of the second evaluation measurement points 70 in direction D4 is referred to as "D4", and the distribution of D4 is referred to as "distribution D4".

The astigmatism distribution is a distribution having a focus at cylindrical power C. As describe above, the astigmatism distribution has no continuity and contains no information on cylinder axis Ax. As a distribution close to the astigmatism distribution, a distribution indicating the difference between the powers (dioptric power) in two directions perpendicular to each other is used in the present embodiment. Such a distribution is close to the astigmatism distribution, and at the same time has continuity and contains information on cylinder axis Ax. Thus, it is possible to perform the evaluation with higher accuracy than that of the conventional evaluation methods.

In the case where the directions of D1 to D4 are set as the arbitrary direction, the number of the distribution indicating the difference between the powers (the dioptric power) in two directions perpendicular to each other is two. In the two distributions, one distribution (referred to as "distribution NT" hereinafter) indicates the difference (NT=D1−D3) between the power distribution in direction D1 (0-degree) and the power distribution in direction D3 (90-degree). The other distribution (referred to as "distribution ST" hereinafter) indicates the difference (ST=D2−D4) between the power distribution in direction D2 (45-degree) and the power distribution in direction D4 (135-degree).

At each of the second evaluation measurement points 70, the set $(S_1', C_1', Ax_1')$ corresponds to the set (D1, D2, D3, D4), and NT and ST can be calculated by using predetermined calculating formulas. In other words, the set $(S_1', C_1', Ax_1')$ corresponds to the set (D1, D2, D3, D4, NT, ST).

Further, by using the six distributions D1, D2, D3, D4, NT, ST, which reflect information on cylinder axis Ax, the optical characteristics (power distribution) of the lens-to-be-measured 100 can be effectively evaluated.

(3) Process for Creating Design Power Distribution (Steps S8, S9)

In addition to the process of Steps S5 to S7, a design dioptric power distribution (calculation power distribution) of the lens-to-be-measured 100 is created for the lens-to-be-measured 100 judged acceptable in the process of the first lens evaluation process (i.e., Step S3).

If the result of the first lens evaluation performed on the lens-to-be-measured 100 in Step 3 is acceptable, then the processor 31 of the evaluation computer 3 acquires the design data and the order receipt data of the lens-to-be-measured 100 from the data server 2 (Step S8).

Next, based on the design data and the order receipt data of the lens-to-be-measured 100, the processor 31 of the evaluation computer 3 creates a three-dimensional shaped model of the lens. Further, based on the created three-dimensional shaped model and the refractive index of the lens, the processor 31 of the evaluation computer 3 calculates the dioptric power of each of points (referred to as "calculation power calculating points" hereinafter) in a wide region, and calculates the power distribution $(S_2, C_2, Ax_2)$ of the dioptric power (Step S9). Incidentally, it is preferred that positions corresponding to the second evaluation measurement points 70 are set as the calculation power calculating points.

Over the entire region, the processor 31 of the evaluation computer 3 subtracts the prescribed power from the calculation power distribution $(S_2, C_2, Ax_2)$ obtained in the process of Step 9 to create a reference calculation power distribution $(S_2', C_2', Ax_2')$.

(4) Process for Converting Calculation Power Distribution into Continuous Power Distribution (Step S10).

Based on the reference calculation power distribution $(S_2', C_2', Ax_2')$ obtained in the process of Step 9, the processor 31 of the evaluation computer 3 creates a design average power distribution, a design astigmatism distribution and a continuous calculation power distribution (Step S10).

The continuous calculation power distribution is created in the same manner as that for creating the aforesaid continuous actually measured power distribution. In other words, powers $(D1_2, D2_2, D3_2, D4_2)$ of each of the calculation power calculating points in direction D1, direction D2, direction D3 and direction D4 are calculated, and a distribution D1, a distribution D2, a distribution D3 and a distribution D4 in design are created. Further, $NT_2$, $ST_2$ are calculated based on $D1_2$, $D2_2$, $D3_2$, and $D4_2$, and a distribution NT and a distribution ST are created. The distribution D1, distribution D2, distribution D3, distribution D4, distribution NT and distribution ST in design have continuity and reflect cylinder axis Ax.

(5) Process for Creating Difference Distribution (Step S7)

Based on the actually measured average power distribution, astigmatism distribution, distributions D1 to D4, distribution NT and distribution ST obtained in the process of Step S6 and the calculated average power distribution, astigmatism distribution, distributions D1 to D4, distribution NT and distribution ST obtained in the process of Step S11, the processor 31 of the evaluation computer 3 creates respective difference distributions (i.e., comparison power distributions). Specifically, the processor 31 of the evaluation computer 3 calculates the difference between each power of the second evaluation measurement points 70 and each power of the calculation power calculating points corresponding to the second evaluation measurement points 70 to create the respective difference distributions.

Difference $\Delta|C|$ of the average power distribution is calculated by the following equation:

$$\Delta|C| = |C_1'| - |C_2'|$$

Difference $\Delta(S+C/2)$ of the average power distribution is calculated by the following equation:

$$\Delta(S+C/2)=(S_1'+C_1'/2)-(S_2'+C_2'/2)$$

Difference $\Delta D1$ of distribution D1 is calculated by the following equation:

$$\Delta D1=D1_1-D1_2$$

Difference $\Delta D2$ of distribution D2 is calculated by the following equation:

$$\Delta D2=D2_1-D2_2$$

Difference $\Delta D3$ of distribution D3 is calculated by the following equation:

$$\Delta D3=D3_1-D3_2$$

Difference $\Delta D4$ of distribution D4 is calculated by the following equation:

$$\Delta D4=D4_1-D4_2$$

Difference $\Delta NT$ of distribution NT is calculated by the following equation:

$$\Delta NT=NT_1-NT_2$$

Difference $\Delta ST$ of distribution ST is calculated by the following equation:

$$\Delta ST=ST_1-ST_2$$

(6) Process for Correcting Difference Distribution (Step S11)

Next, a difference distribution correcting process for weighting the difference distributions ($\Delta D1$, $\Delta D2$, $\Delta D3$, $\Delta D4$, $\Delta NT$, $\Delta ST$) of each of the second evaluation points obtained in Step S7 will be described below.

Herein, weighting process for the spectacle lens will be described below. Generally, it is preferred that the spectacle lens is evaluated giving large weight to the region mostly used by the wearer. For example, if the lens is a single-vision lens, then the evaluation is performed giving large weight to a region near the optical center. Further, if the lens is a progressive-addition lens, then the evaluation is performed giving large weight to a region extending from the distance portion to the near portion. Weighting process is effective particularly for a progressive-addition lens.

Specifically, a progressive-addition lens includes a distance portion region and a near portion region, the distance portion region is for viewing things in a distant place, and the near portion region is for viewing things in a near place. In the progressive-addition lens, the distance portion region is regarded as a reference, and the power for viewing things in a near place is added to the power of the distance portion. Due to the existence of the added power, astigmatism will occur in the region on the side of the near portion region of the progressive-addition lens. Thus, with the progressive-addition lens, good visual field can not be obtained through the region where the astigmatism occurs. Thus, it is preferred that the progressive-addition lens is distinguished into regions of: the mostly used region extending from the distance portion to the near portion and the unclear region on the side of the near portion, and the evaluation is performed by adding weight according to the distinction.

Specifically, the evaluation is performed in the following manner. The region having small astigmatism is considered as a region through which a good visual field can be obtained. Thus, large weight is given to the region having small astigmatism, and small weight is given to the region on the side of the near portion having large astigmatism. Herein, the magnitude of the difference is dependent on the magnitude of the addition power. Incidentally, the addition power equals to the difference between the near portion vertex power and the distance portion vertex power measured under a predetermined condition. Therefore, the weighting changes according to the magnitude of the addition power. Thus, it is preferred that the value of the weighting changes with the addition power as a variable, instead of being fixed to a constant valued.

Thus, the weighting process is performed so that the allowable difference changes in a manner in which the allowable difference is reduced in the region through which a good visual field can be obtained, and the allowable difference is increased in the unimportant region. [Equation 2] shows a concrete example of a weighting function used for performing weighting process. Incidentally, the weighting Wj (as a weighting calculation coefficient) calculated by using the below equation is stored in the weighting calculation coefficient storing section 322.

$$W_j = A \times AS_j \qquad \text{[Equation 2]}$$

where:
j: Measurement point
A: Constant
AS: Magnitude of the astigmatism at the measurement point j of the calculation power distribution
Wj: Weight Incidentally, if the number of the measurement point j is N, then the measurement point j is any one number in a range of 1-N.

Next, the six difference distributions D1, D2, D3, D4, NT and ST are weighted using the weight Wj obtained by the above equation. Specifically, the processor 31 of the evaluation computer 3 acquires the weight Wj (i.e., the weighting calculation coefficient) from the weighting calculation coefficient storing section 322 to perform weighting process on the six difference distributions D1, D2, D3, D4, NT and ST. The weight at each measurement point j of the six difference distributions D1, D2, D3, D4, NT and ST is calculated using the following Equation 3. Thereby the weighted difference distributions ($\delta D1$, $\delta D2$, $\delta D3$, $\delta D4$, $\delta NT$, $\delta ST$) can be obtained.

$$\delta D1_j = \Delta D1_j - W_j$$

$$\delta D2_j = \Delta D2_j - W_j$$

$$\delta D3_j = \Delta D3_j - W_j$$

$$\delta D4_j = \Delta D4_j - W_j$$

$$\delta NT_j = \Delta NT_j - W_j$$

$$\delta ST_j = \Delta ST_j - W_j \qquad \text{[Equation 3]}$$

(7) Process for Creating Difference Differential Distribution (Step S12)

Next, a difference differential distribution is created based on the difference distribution having been corrected in Step S11. First, the processor 31 of the evaluation computer 3 calculates a difference differential value (ED1, ED2, ED3, ED4, ENT, EST) based on the corrected difference distribution. The difference differential value (difference index) is a value in a direction in which the absolute value of the value obtained by primarily differentiating the difference distribution with respect to the distance between the measurement points in the lens becomes maximum. The difference differential value is also referred to as "difference index". The difference index is calculated, for example, by using the following [Equation 4].

$$ED1_j = \left(\left|\frac{\partial \Delta D1_j}{\partial s}\right|\right)_{max}$$

$$ED2_j = \left(\left|\frac{\partial \Delta D2_j}{\partial s}\right|\right)_{max}$$

$$ED3_j = \left(\left|\frac{\partial \Delta D3_j}{\partial s}\right|\right)_{max}$$

$$ED4_j = \left(\left|\frac{\partial \Delta D4_j}{\partial s}\right|\right)_{max}$$

$$ENT_j = \left(\left|\frac{\partial \Delta NT_j}{\partial s}\right|\right)_{max}$$

$$EST_j = \left(\left|\frac{\partial \Delta ST_j}{\partial s}\right|\right)_{max}$$

[Equation 4]

where:
E: Difference index
s: Distance within lens
j: Measurement point

Herein j represents the measurement point, and if the number of the measurement point j is N, then the measurement point j is any one number in a range of 1-N.

Next, the processor 31 of the evaluation computer 3 creates a difference index distribution within the lens base on the difference index.

Figure 7:
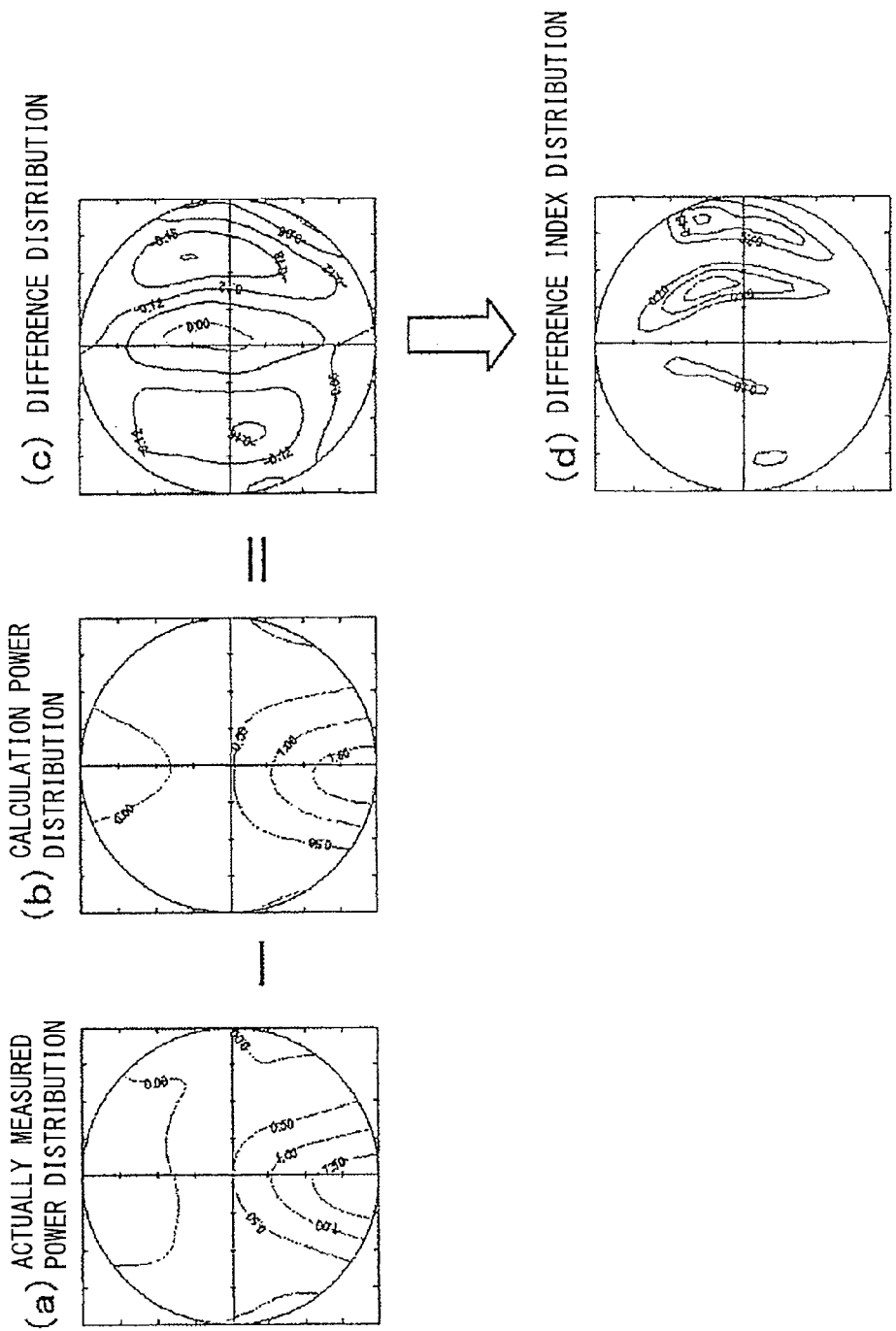
FIG. 7 is a view explaining a process for obtaining a difference index distribution in an example.

FIG. 7 shows an example in which the actually measured power distribution, the calculation power distribution, the difference distribution and the difference index distribution in the distribution D1 are displayed on the display device.

As shown in FIG. 7, the evaluation computer 3 allows the difference index distribution to be, for example, displayed on a display (the output means 5) or printed on a paper with a printer. Herein, in the difference index distribution, the value of the difference index is indicated by, for example, contour lines, color density or the like. FIG. 7(d) shows a case where the value of the difference index is indicated by contour lines.

As can be known from FIG. 7(c) and FIG. 7(d), the position where the interval of contour lines is small has large difference index. Further, in the case where the value of the difference index is indicated by color density, the position having large difference index is indicated in dark color, and the position having small difference index is indicated in light color, for example. The position having large difference index represents a position where the difference changes greatly, and the position having small difference index represents a position where the difference changes slightly. In other words, by creating the difference index distribution, it is possible to easily identify the difference which changes greatly and locally (i.e., the irregular difference), and it is possible to judge whether there is a local difference on the lens-to-be-measured and to objectively and visually know the magnitude and position of the local difference.

Figure 8:
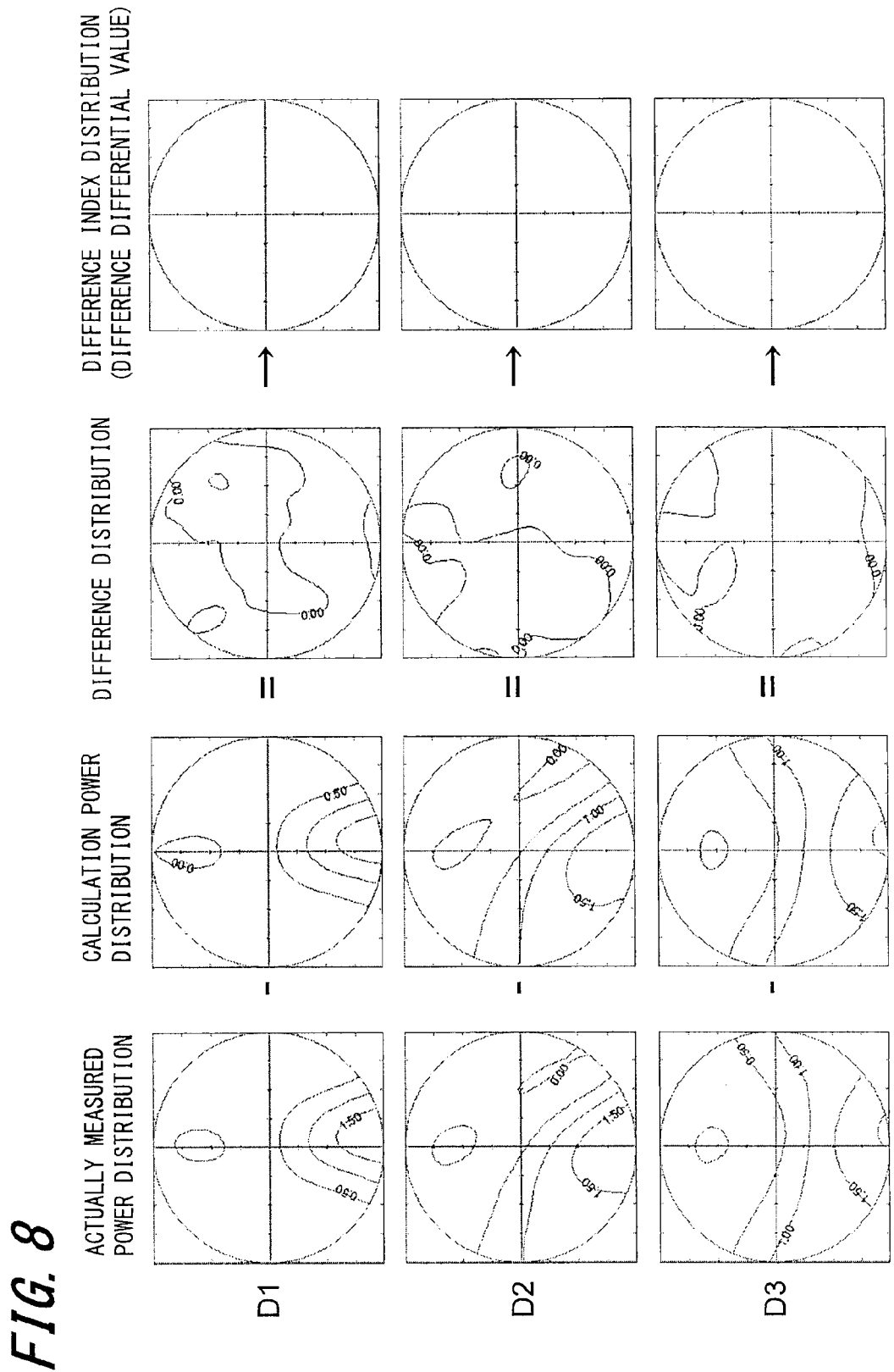
FIG. 8 is a view explaining a process for obtaining the difference index distribution from distributions (D1, D2, D3) in an example.
Figure 9:
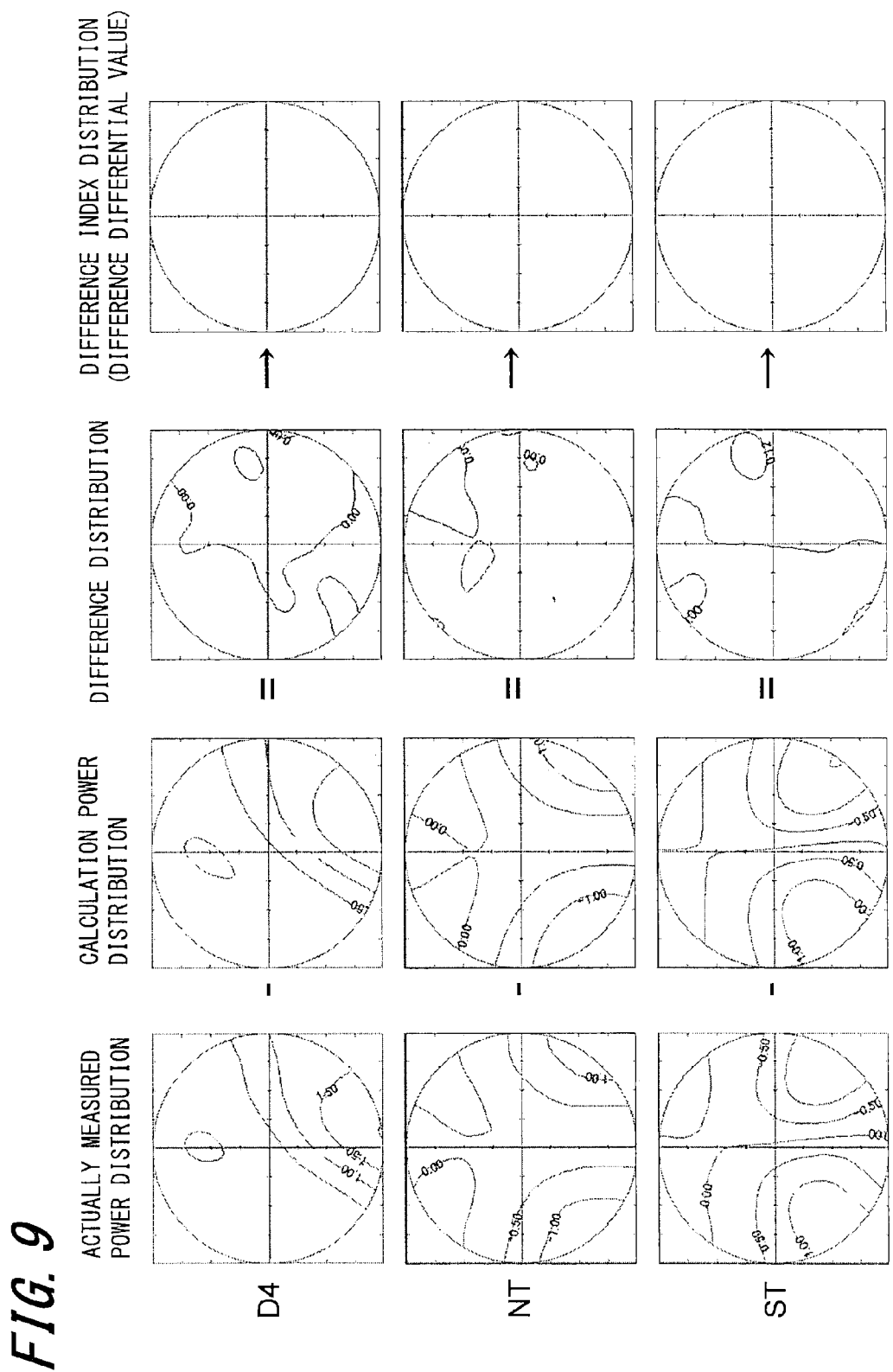
FIG. 9 is a view explaining a process for obtaining the difference index distribution from distributions (D4, NT, ST) in an example.
Figure 10:
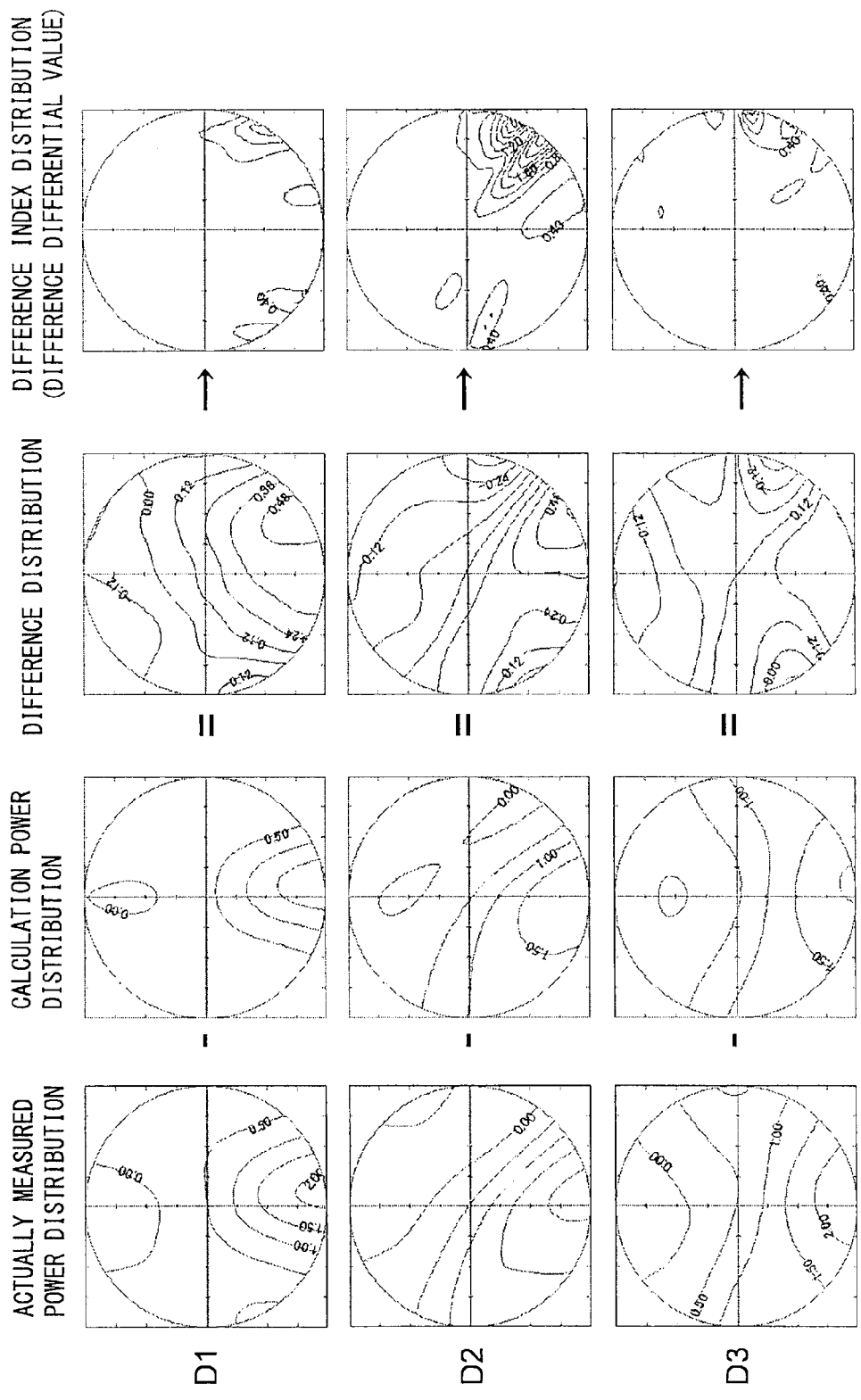
FIG. 10 is a view explaining a process for obtaining the difference index distribution from distributions (D1, D2, D3) in an example.
Figure 11:
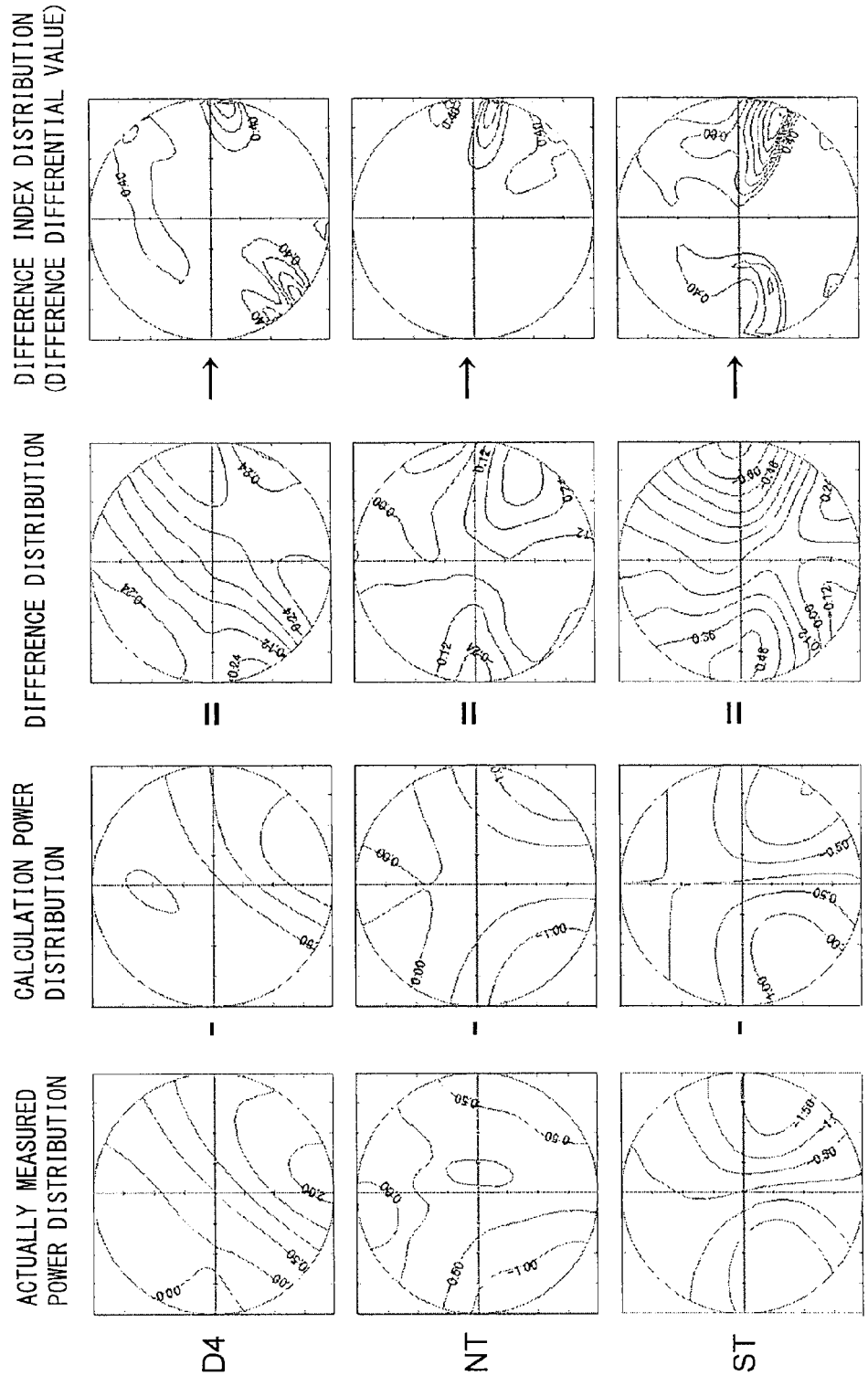
FIG. 11 is a view explaining a process for obtaining the difference index distribution from distributions (D4, NT, ST) in an example.

The following is an example in which the actually measured power distribution, the calculation power distribution, the difference distribution and the difference index distribution of the six distributions D1, D2, D3, D4, NT and ST of a progressive-addition lens (distance portion power (S: −1.00, C: 0.00); addition power: 2.00) are actually measured, calculated and displayed. FIGS. 8 and 9 show an example of a lens having almost no local difference, wherein FIG. 8 shows distributions D1, D2 and D3, and FIG. 9 shows distributions D4, NT and ST. FIGS. 10 and 11 show an example of a lens having local difference, wherein FIG. 10 shows distributions D1, D2 and D3, and FIG. 11 shows distributions D4, NT and ST.

As shown in FIGS. 8 to 11, the evaluation computer 3 may allow the display (the output means 5) to display all the six distributions created in Step S6, Step S7, Step S10 and Step S12, so that it is possible to objectively and visually know the magnitude of the difference of the spectacle lens, the position of the difference, and the type of the difference (local difference or total difference). Further, the four distributions D1 to D4 represent the powers in four directions in the lens, so that it is possible to identify the direction in which the difference is generated. As a result, it is possible to perform a spectacle lens evaluation with high accuracy.

Incidentally, display method of the difference distribution and the difference index distribution is not limited to the method shown in FIGS. 7 to 11. For example, the difference distribution and the difference index distribution may be displayed as three-dimensional shape data on a display. In such a case, the position having large difference is indicated as a high position, and the position having small difference is indicated as a low position, so that it is possible to easily and visually know whether there is a local difference on the spectacle lens or not, and identify the magnitude and position of the local difference. Further, the magnitude of the difference may also be converted into size of point to be displayed within the lens.

Incidentally, the difference differential value (the difference index) may also be obtained based on the difference distribution created in Step S7, before performing the process of Step S8. In other words, the difference index may be calculated based on the difference distribution having not been corrected by performing weighting process. The difference differential value (the difference index) can be obtained using the following [Equation 5]. Further, the difference index may also be subject to a weighting process.

$$ED1_j = \left(\left|\frac{\partial \Delta D1_j}{\partial s}\right|\right)_{max}$$

$$ED2_j = \left(\left|\frac{\partial \Delta D2_j}{\partial s}\right|\right)_{max}$$

$$ED3_j = \left(\left|\frac{\partial \Delta D3_j}{\partial s}\right|\right)_{max}$$

$$ED4_j = \left(\left|\frac{\partial \Delta D4_j}{\partial s}\right|\right)_{max}$$

$$ENT_j = \left(\left|\frac{\partial \Delta NT_j}{\partial s}\right|\right)_{max}$$

$$EST_j = \left(\left|\frac{\partial \Delta ST_j}{\partial s}\right|\right)_{max}$$

[Equation 5]

where:
E: Difference index
s: Distance within lens
j: Measurement point (8) Process for Creating Evaluation Index (Step S13)

A process for creating an evaluation index β based on the difference index obtained in Step S12 will be described below.

First, in the six difference indexes of each of the second evaluation measurement points, the processor 31 of the evaluation computer 3 selects a distribution which has the largest value as a representative value so as to avoid multiple evaluations. Further, the processor 31 of the evaluation computer 3 sums the all points within the evaluation region of the largest distribution, and averages the summed value. The summed value represents a difference index for characterizing the entire actually measured power distribution.

Herein, if there is a locally changing difference (an irregular difference) unintended in design, the difference differential value will become large. Therefore, when there is a locally changing difference, the difference index is apt to increase. Thus, the processor 31 of the evaluation computer 3 calculates the evaluation index β by subtracting the sum of the difference indexes from a predetermined maximum value. The maximum value is set to, for example, 100. As a result, the closer to 100 the score is, the smaller the difference is (which means that the design is well reflected). In contrast, the lower the score is, the larger the difference is (which means that the design is not well reflected).

The index (the evaluation index) β may be expressed by the following [Equation 6]. Herein, C represents a constant. It can be known from Equation 6 that, if there is a power-change which changes locally and greatly, then the index β will decrease, and if there is no such a power-change, then the index β will increase.

$$\beta = 100 - \frac{1}{N}\sum_{j=1}^{N} C \times \max\begin{pmatrix} ED1_j, ED2_j, ED3_j, \\ ED4_j, ENT_j, EST_j \end{pmatrix}$$ [Equation 6]

Incidentally, the evaluation index β of the lens shown in FIGS. 8 and 9 is 93, and the evaluation index β of the lens shown in FIGS. 10 and 11 is 11. If such an evaluation index is displayed on the display (the output means 5), evaluation can be preferably performed objectively and easily.

Note that the evaluation index is not limited to be obtained using the aforesaid method. For example, the difference index for calculating the evaluation index may also be obtained by summing the all points within the evaluation region of the six difference indexes of each of the second evaluation measurement points, and averaging the summed value. Further, in the six difference indexes of each of the second evaluation measurement points, the distribution which has the largest value and the distribution which has the second-largest value may both be selected as representative values. Further, although the evaluation index is obtained by subtracting the sum of the difference indexes from 100 in the above example, the difference index itself may be used as the evaluation index. Further, although the maximum value is set to 100 in the above example, the maximum value may also be set to 10, 1000 and the like according to demand of the user, instead of being limited to 100.

(9) Acceptable/Unacceptable Judging Process (Steps S14 to S16)

Next, an acceptable/unacceptable judging process of the lens is performed using the evaluation index obtained in Step S13.

In the present embodiment, first, the power distribution is measured for a plurality of lenses to calculate the index β of each of the lenses. A frequency distribution is obtained based on the index β of each of the lenses, and the obtained frequency distribution is stored in the acceptable/unacceptable reference storing section 321 as acceptable/unacceptable judgment reference data. If the index of the lens is largely deviated from the frequency distribution, then the lens is considered to have large variation compared with the majority other lenses, and therefore is judged unacceptable. Thus, the processor 31 of the evaluation computer 3 judges that the result of the second lens evaluation performed on the lens-to-be-measured 100 is unacceptable, and thereby the lens evaluation is terminated (Step S4). Similar to the first lens evaluation, the unacceptable lens-to-be-measured 100 is remade, or reused as resources.

In contrast, if the index β of the lens is not largely deviated from the frequency distribution, then the lens is considered to not have large variation compared to the other majority lenses, and therefore is judged acceptable. Thus, the processor 31 of the evaluation computer 3 judges that the result of the second lens evaluation performed on the lens-to-be-measured 100 is acceptable, and thereby the processing is passed to the next step (Step S17).

Note that the second lens evaluation is not limited to be judged using the aforesaid method. For example, the second lens evaluation may also be judged using the following method: a threshold is set for the evaluation index β is stored in the acceptable/unacceptable reference storing section 321 as acceptable/unacceptable reference data, and if the evaluation index β obtained in Step S13 is greater than the threshold, then the lens is judged acceptable; while if the evaluation index β is smaller than the threshold, then the lens is judged unacceptable. The threshold can be suitably set according to accuracy of the lens required by the user.

4. Next-Process (Step S17)

The lens-to-be-measured 100 judged acceptable in the process of Step S15 is passed to a next-process. In the next process, dyeing and various coating treatments are performed according to order requirement. Thereafter, the edge of the lens is grinded to be conformed to the frame shape and the segment shape, and thereby the manufacture of the spectacle lens is completed. The manufactured spectacle lens is delivered to the customer who places the order.

As described above, in the lens evaluation method of the present embodiment, the power distribution is measured using a method (referred to as "actually measured power distribution" hereinafter), a subtraction is performed between the actually measured power distribution and the calculation power distribution in design (referred to as "actually measured power distribution" hereinafter) to calculate a distribution of the difference (referred to as a "difference distribution" hereinafter). Further, it is possible to numerically characterize the actually measured power distribution by differentiating the entire difference distribution. Thus, it is possible to evaluate the optical performance of the manufactured lens to see whether there is a power change unintended in design (i.e., a difference which changes locally).

Further, the difference distribution and/or the difference index distribution obtained by differentiating the difference distribution are/is displayed on the display. Thus, it is possible to easily and visually know the magnitude and the position of the difference caused on the spectacle lens.

Further, the measured power distribution is converted into a power distribution in an arbitrary direction (in the present embodiment, the arbitrary direction includes: 0-degree (direction D1), 45-degree (direction D2), 90-degree (direction D3) and 135-degree (direction D4), assuming that the horizontal direction is 0-degree and the counterclockwise direction is the positive direction). Thus, it is possible to perform evaluation taking into consideration of cylinder axis Ax, and therefore evaluation can be performed with higher accuracy. Further, by displaying the power distribution in the arbitrary direction on the display, it is possible to identify the direction of the difference caused within the lens.

[Method for Judging Lenses Having Different Lens Design]

Next, evaluation results respectively for two progressive-addition lenses having the same power and same design type and two progressive-addition lenses having the same power but different design type will be described below.

In such a case, the processor 31 of the evaluation computer 3 uses one of the two lenses as a reference. In other words, one of the two lenses is evaluated as a calculation power distribution. The index β of the two progressive-addition lenses having the same design type shows a high value. In contrast, the index β of the two progressive-addition lenses having different design type shows a low value. This means that the evaluation index of the present invention is also effective in evaluating the difference in design, and therefore can be used to judge the difference in design between two lenses.

[Method for Manufacturing Lens]

A method for manufacturing a lens using the aforesaid lens evaluation method will be described below with reference to FIG. 12.

Figure 12:
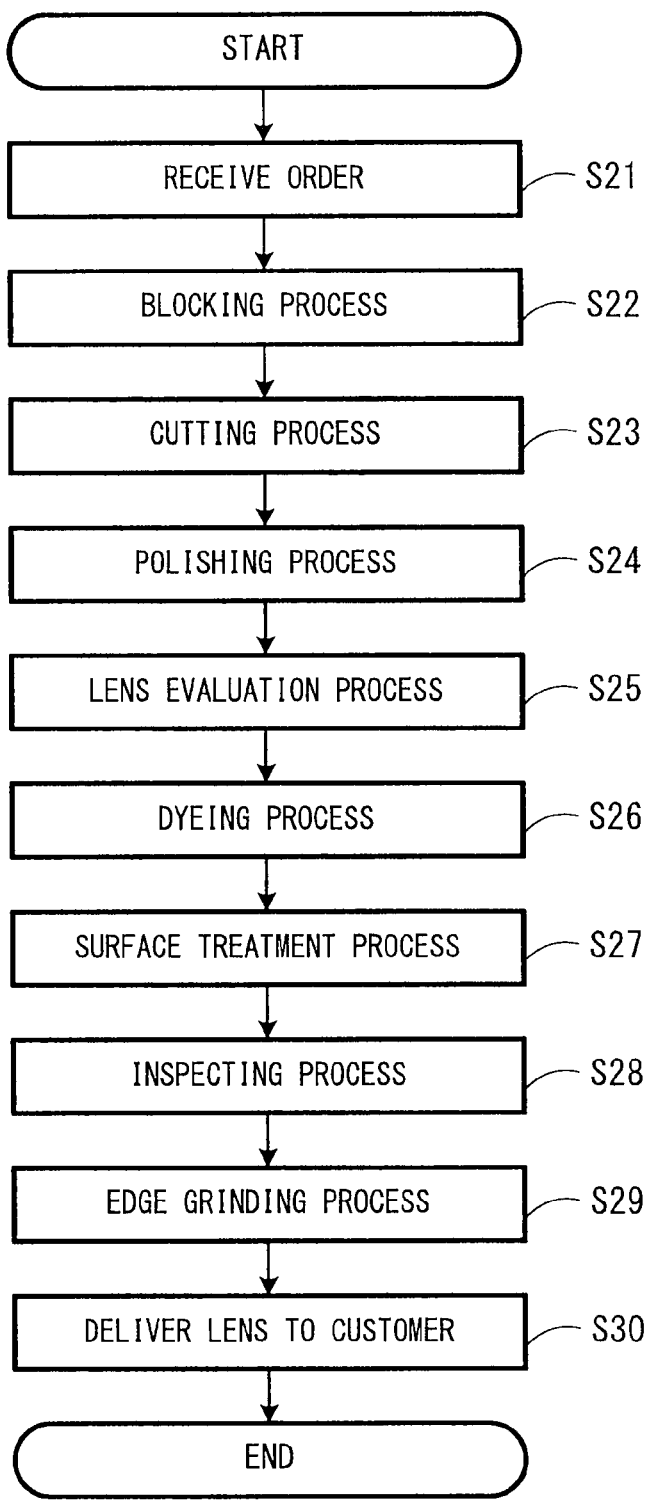
FIG. 12 is a flowchart showing a method for manufacturing a spectacle lens according to the embodiment of the present invention.

FIG. 12 is a flowchart showing steps for manufacturing a lens from order receipt to delivery.

First, an order is received (Steps S21). When an order program of the order terminal 91 of the spectacles store 9 (see FIG. 1) is started, the order terminal 91 is connected to the main server 7 through the communication media 8. Thereby an order entry screen is displayed on a display of the order terminal 91. An operator of the spectacles store 9 inputs order information with an input device of the order terminal 91, the order information including information on the spectacle lens being ordered, information on spectacle frame, prescribed values, layout information and the like.

The order information inputted from the order terminal 91 is transmitted to the main server 7 through the communication media 8. Upon receiving the order information inputted from the order terminal 91, the main server 7 executes a spectacle lens processing design program to calculate a desired lens shape including lens edge shape. If it is judged that the lens can not be manufactured based on the calculation result, then the main server 7 prompts the order terminal 91 to revise the inputted order data. While if it is judged that the lens can be manufactured based on the calculation result, then the main server 7 confirms receipt of the order.

When receipt of the order is confirmed, the order information transmitted from the order terminal 91 is stored in the order receipt data storing section 22 of the data server 2 as order receipt data. Further, when receipt of the order is confirmed, information on lens shape calculated by the spectacle lens processing design program is stored in the design data storing section 21 of the data server 2 as design data.

The spectacle lens processing design program also calculates lens processing design values for performing respective processes, and determines processing conditions (i.e., sets values of various devices, jigs to be used and the like) for processing the lens based on the processing design values. Further, the information on lens processing (the processing design values, processing conditions) is stored in the storage 20 of the data server 2 as processing data for being used to control the various devices.

In the factory, many kinds of lens blanks are previously manufactured and stocked, the lens blanks including semi-finished lens blanks (referred to as "semi-finished lens" hereinafter) with only one surface optically finished and lens blanks with both surfaces optically unfinished. A lens blank for manufacturing the lens is selected from stocked lens blanks based on the design data and processing data.

Next, the processing is passed to a blocking process (Step S22). The blocking process is a process for attaching a lens holder to both the front surface and back surface of the lens, so that the lens can be attached on a cutting device and a polishing device respectively used for performing a cutting process and a polishing process (which are to be described later).

Next, the cutting process is performed on the optically unfinished surface of the lens blank (Step S23). The cutting process is a process for cutting the surface into a predetermined surface shape with a cutting device, leaving a polishing margin. The surface shape to be cut is previously determined based on the design data and the processing data.

Next, the polishing process is performed on the cut surface (Step S24). The polishing process is a process for polishing the cut surface of the lens with the cutting device to optically finish the surface of the lens. The polishing condition is previously determined according to the processing data. The process from Step S21 to Step S24 corresponds to the pre-process shown in FIG. 3.

Next, the lens evaluation process is performed on the lens whose both surfaces having been optically finished (Step S25). Since the details about the lens evaluation process have been described with reference to FIG. 3, the description thereof will be skipped.

Next, the dyeing process is performed on the lens having been judged acceptable in the lens evaluation process of Step S25 according to necessity (Step S26). The dyeing process is a process for dyeing the lens. The lens is dyed into the color instructed by the order receipt data. In the case where a color sample is provided, the lens is dyed into a color closed to the sample. There are various dyeing methods. Examples of the dyeing methods include, for example, immersing the lens in a dye liquid for a predetermined time, and then heating the lens so that the dye immersed into the lens is diffused and stabilized inside the lens.

Incidentally, the lens unnecessary to be dyed is passed to the surface treatment process after the lens evaluation process is performed.

Next, the surface treatment process is performed on the lens (Step S27). The surface treatment process is a process for performing surface treatments such as forming a hard coat, an antireflection film, a water-spotting preventing coat, an antifouling film and the like. These surface treatments are performed according to the instruction given in the order receipt data.

Next, an inspecting process is performed on the lens (Step S28).

In the inspecting process, the appearance of the lens, the optical characteristics at the predetermined measurement positions (for example, at the optical center) of the lens, the thickness of the lens and the like are checked. The lens meter 6 and a thickness meter (not shown) are connected to a computer for controlling the inspecting process. The computer for controlling the inspecting process compares the actually measured values at the predetermined measurement positions obtained by the lens meter 6 and the thickness meter with the lens specification based on the order receipt data and the design data to judge whether the lens is acceptable or not.

Next, an edge grinding process (an edging process) is performed on the lens (Step S29). Incidentally, if the instruction for performing the edge grinding process (the edging process) is not given in the order receipt data, then the lens is delivered to the customer who places the order after the inspecting process is completed.

In the edge grinding process (i.e., the edging process), a lens holder is attached to the lens, and the lens is cut with a grinding device so as to form an edge which fits the predetermined segment shape and the frame shape. The perimeter and shape of the edged lens are measured with a shape measuring device (not shown), and the measured results are compared with the processing data to judge whether the lens is acceptable or not. If it is judged that the lens is acceptable, the appearance, the optical characteristics and the thickness of the lens is checked again, and the acceptable lens is delivered to the customer who places the order (Step S30).

Although the lens evaluation process (Step S25) is performed immediately after the process for optically finishing the both optical surfaces in the present embodiment, the lens evaluation process may also be performed in further later step. Further, the lens evaluation process may also be performed for more than one time during the manufacturing process. Incidentally, it is preferred to perform the lens evaluation process immediately after the cutting process and polishing process, so that the difference from the design data can be found in an early stage, and therefore the lens having great difference from the design data can be prevented from being passed to the next process.

Further, according to the present invention, since the type of difference (total difference or local difference) can be grasped, the cause of the difference can be easily identified.

Further, although the prescribed power is subtracted from the actually measured dioptric power distribution and the calculation power distribution in the present embodiment, the prescribed power does not have to be subtracted.

EXPLANATION OF REFERENCE NUMERALS

1 Power distribution measuring device
2 Data server
3 Evaluation computer
4 Input means
5 Output means
6 Lens meter
7 Main server
8 Communication media
9 Spectacles store
10 Spectacle lens evaluation device
20 Storage
21 Design data storing section
22 Order receipt data storing section
23 Measured result storing section
24 Acceptable/unacceptable judgment result storing section
31 Processor
32 Storage
70 Second evaluation measurement point
91 Order terminal
100 Lens-to-be-measured
321 Acceptable/unacceptable reference storing section
322 Weighting calculation coefficient storing section

The invention claimed is:

1. A lens evaluation method comprising: a power distribution converting step for obtaining a power distribution of a plurality of measurement points in an arbitrary direction based on an actually measured power distribution of a spectacle lens, the actually measured power distribution consisting of a point group indicating spherical power, cylindrical power and cylinder axis; a calculation power distribution creating step for creating a calculation power distribution of the spectacle lens; a difference distribution calculating step for obtaining a difference distribution between the actually measured power distribution, which indicates an actual power distribution of the spectacle lens, and the calculation power distribution; a difference index calculating step for obtaining a difference index by differentiating the difference distribution obtained in the difference distribution calculating step with respect to the distance between the plurality of measurement points in the lens; and an evaluation step for evaluating the spectacle lens based on the difference index calculated in the difference index calculating step.

2. The lens evaluation method according to claim 1, wherein the arbitrary direction is a plurality of equiangularly-spaced directions.

3. The lens evaluation method according to claim 1, wherein the difference index calculated in the difference index calculating step is a value in a direction in which the absolute value of the value obtained by differentiating the difference distribution with respect to the distance between the plurality of measurement points in the lens becomes maximum.

4. The lens evaluation method according to claim 1, further comprising a difference distribution correcting step for weighting the difference distribution in a near portion and a distance portion of the spectacle lens.

5. The lens evaluation method according to claim 1, further comprising a difference distribution correcting step for weighting the difference distribution using astigmatism as a reference.

6. The lens evaluation method according to claim 1, further comprising a difference distribution correcting step for weighting the difference distribution using weights calculated by the following equation:

$$W_j = A \times AS_j$$

$$E_j = D_j - W_j \qquad \text{[Equation 1]}$$

where:
j: Measurement point
A: Constant
AS: Magnitude of the astigmatism at the measurement point j of the calculation power distribution
Wj: Weight
Ej: Difference distribution in which the weight has been taken into consideration
Dj: Difference distribution.

7. The lens evaluation method according to claim 1, wherein the evaluation is performed by comparing two lenses having different design type.

8. A lens evaluation device comprising: a power distribution measuring device for measuring power which includes spherical power, cylindrical power and cylinder axis at a plurality of measurement points of a spectacle lens to obtain an actually measured power distribution; and an evaluation computer having a processor for evaluating the spectacle lens using the actually measured power distribution, wherein the processor of the evaluation computer performs: a power distribution converting process obtaining a power distribution of the plurality of measurement points in an arbitrary direction based on the actually measured power distribution; a calculation power distribution creating process for creating a calculation power distribution of the spectacle lens; a difference distribution calculating process for obtaining a difference distribution between the actually measured power distribution, which indicates an actual power distribution of the spectacle lens, and the calculation power distribution; a difference index calculating process for obtaining a difference index by differentiating the difference distribution obtained in the difference distribution calculating process with respect to the distance between the plurality of measurement points in the lens; and an evaluation process for evaluating the spectacle lens based on the difference index calculated in the difference index calculating process.

9. A method for manufacturing a spectacle lens comprising:
- a step for optically finishing optically-unfinished surface(s) of a lens blank; and
- a lens evaluation step for evaluating whether a difference from design data of the lens with both surfaces optically finished is within an allowance or not, wherein the lens evaluation step includes:
- a power distribution converting step for obtaining a power distribution of a plurality of measurement points in an arbitrary direction based on an actually measured power distribution of the spectacle lens, the actually measured power distribution consisting of a point group indicating spherical power, cylindrical power and cylinder axis;
- a calculation power distribution creating step for creating a calculation power distribution of the spectacle lens;
- a difference distribution calculating step for obtaining a difference distribution between the actually measured power distribution, which indicates an actual power distribution of the spectacle lens, and the calculation power distribution;
- a difference index calculating step for obtaining a difference index by differentiating the difference distribution obtained in the difference distribution calculating step with respect to distance between the plurality of measurement points in the lens; and
- an evaluation step for evaluating the spectacle lens based on the difference index calculated in the difference index calculating step.

10. A method for displaying characteristics of a lens comprising:
- a power distribution converting step for obtaining a power distribution of a plurality of measurement points in an arbitrary direction based on an actually measured power distribution of a spectacle lens, the actually measured power distribution consisting of a point group indicating spherical power, cylindrical power and cylinder axis;
- a calculation power distribution creating step for creating a calculation power distribution of the spectacle lens;
- a difference distribution calculating step for obtaining a difference distribution which represents a distribution of a difference between the actually measured power distribution, which indicates an actual power distribution of the spectacle lens, and the calculation power distribution;
- a difference index calculating step for obtaining a difference index by differentiating the difference distribution obtained in the difference distribution calculating step with respect to distance between the plurality of measurement points in the lens;
- a difference index distribution creating step for creating, based on the difference index calculated in the difference index calculating step, a distribution of the difference index within the spectacle lens;
- and a display step for displaying the difference index distribution created in the difference index distribution creating step.

* * * * *